US012807211B2

(12) United States Patent
West

(10) Patent No.: US 12,807,211 B2
(45) Date of Patent: Nov. 24, 2026

(54) STEERING SYSTEM FOR A VEHICLE

(71) Applicant: Adam West, Berkley, MI (US)

(72) Inventor: Adam West, Berkley, MI (US)

( * ) Notice: Subject to any disclaimer, the term of this patent is extended or adjusted under 35 U.S.C. 154(b) by 12 days.

(21) Appl. No.: 18/150,895

(22) Filed: Jan. 6, 2023

(65) Prior Publication Data

US 2024/0227911 A1 Jul. 11, 2024

(51) Int. Cl.

*B62D 1/20* (2006.01)
*B60W 60/00* (2020.01)
*B62D 5/04* (2006.01)

(52) U.S. Cl.

CPC ............. *B62D 1/20* (2013.01); *B60W 60/001* (2020.02); *B62D 5/0409* (2013.01)

(58) Field of Classification Search

CPC .......... B62D 1/20; B62D 5/0409; B62D 1/16; B62D 15/025; B60W 60/001

See application file for complete search history.

(56) References Cited

U.S. PATENT DOCUMENTS

2018/0273081 A1* 9/2018 Lubischer ................ B62D 1/19
2021/0300456 A1* 9/2021 Iizawa ................... B62D 5/001
2021/0325901 A1* 10/2021 Gyllenhammar ............................ B60W 50/0098

FOREIGN PATENT DOCUMENTS

CN 112543727 A * 3/2021 ............... B62D 3/12
WO 2023/107555 A1 6/2023

* cited by examiner

*Primary Examiner* — Anne Marie Antonucci
*Assistant Examiner* — Jewel A Kuntz

(57) ABSTRACT

At least one embodiment provides a steering system for a vehicle. The steering system includes a steering assembly. The steering assembly includes a steering wheel selectively engaged to a steering mechanism. The steering system further includes an automated driving system coupled to the steering assembly. The automated driving system sets an operational state for the automated driving system. The automated driving system sets an engagement state for the steering wheel.

20 Claims, 13 Drawing Sheets

STEERING SYSTEM FOR A VEHICLE

TECHNICAL FIELD

One or more embodiments herein generally relate to a steering system for a vehicle.

BACKGROUND

A conventional automobile includes a steering wheel. The steering wheel is attached to a steering column. The steering column may be attached to a steering gearbox. Alternatively, the steering column may be attached to a rack and pinion. The steering gearbox may be attached to a suspension of the conventional automobile. For example, a first tie rod may attach the steering gearbox to a first knuckle of the suspension. The first knuckle may attach to a first wheel hub. A first wheel of the conventional automobile may attach the first wheel hub. Similarly, a second tie rod may attach the steering gearbox to a second knuckle of the suspension. The second knuckle may be opposite and laterally spaced from the first knuckle. The second knuckle may attach to a second wheel hub. A second wheel of the conventional automobile may attach to the second wheel hub.

In the conventional automobile, the steering wheel is in a passenger compartment. In the passenger compartment, the steering wheel is positioned in front of a driver seat. An occupant seated in the driver seat may use the steering wheel to steer the conventional automobile. For example, when traveling in a forward direction, the occupant may use the steering wheel to keep the conventional automobile heading straight or to turn the conventional automobile, such as to the right or left. To turn to the right, the occupant may rotate the steering wheel in a clockwise direction. Similarly, to turn to the left, the occupant may rotate the steering wheel in a counterclockwise direction. Here, the clockwise direction and the counterclockwise direction are based on the viewpoint of the occupant when seated in the driver seat and looking directly at the steering wheel. In the conventional automobile, the steering wheel may be used to steer the conventional automobile because the steering wheel is attached to one or more wheels of the conventional automobile. Because of that attachment, the occupant may use the steering wheel to change an angular orientation of a wheel of the conventional automobile relative to a centerline of the conventional automobile. In doing so, for example, the occupant may cause the conventional automobile to travel straight ahead in a forward direction, turn to the left, or turn to the right.

The conventional automobile now includes an advanced driver assistance system. The advanced driver assistance system may control driving and steering the conventional automobile. To steer the conventional automobile, the advanced driver assistance system rotates the steering wheel.

When the advanced driver assistance system rotates the steering wheel, the occupant may be concerned with or frustrated by such rotations. The occupant, for example, may be uncertain where to place the occupant's hands. When the advanced driver assistance system is activated and the occupant is in contact with the steering wheel, such as in the event that the occupant is holding the steering wheel with the occupant's hands, the occupant may compromise the performance of the advanced driver assistance system. This may be by preventing the advanced driver assistance system to rotate the steering wheel to the intended degree within the intended amount of time. In that case, the occupant may trigger a fault condition in the advanced driver assistance system due to the occupant's interference with the steering wheel. The fault condition may result in the advanced driver assistance system aborting control of driving, which may hastily return all control back to the occupant or cause the conventional automobile to come to a stop (if moving) or stay stopped (if already at a stop). If the occupant unintentionally triggered the fault condition, the occupant may grow concerned with or frustrated by the advanced driver assistance system. Similarly, the occupant may have a propensity or desire to grab the steering wheel when the steering wheel is rotating while under the control of the advanced driver assistance system. This may be out of habit and driver education, such as the teachings of keeping hands on the steering wheel and keeping hands at 10 o'clock and 2 o'clock positions on the steering wheel. As such, it would be natural for the occupant to want to reach out and grab the steering wheel, particularly one that is rotating independent of the occupant's actions. Additionally, the occupant may be concerned with or frustrated by the rotational speed of the steering wheel when controlled by the advanced driver assistance system. For example, the occupant may be resting on a hub of the steering wheel, such as a wrist of the occupant lying on the hub, when the advanced driver assistance system suddenly causes the steering wheel to rotate. In such case, a spoke of the steering wheel extending from the hub of the steering wheel may collide with the occupant, such as the occupant's wrist. This may result in an unpleasant experience for the occupant. Similarly, in the event that the occupant places an object, such as a book, a magazine, or a beverage container, on the steering wheel, the object may unexpectedly fall unexpectedly upon rotation of the steering wheel by the advanced driver assistance system. This also may result in an unpleasant experience for the occupant.

SUMMARY

One or more embodiments describe a steering system for a vehicle. The steering system including a steering assembly and an automated driving system. The steering assembly including a steering wheel, a coupling device on the steering wheel, and a steering shaft selectively engaged to the steering wheel through the coupling device. The automated driving system is coupled to the steering assembly. The automated driving system includes a processor configured to set an operational state of the automated driving system, and set, based on the operational state, an engagement state of the steering wheel to the steering shaft through the coupling device.

One or more embodiments describe a steering system for a vehicle. The steering system includes a steering assembly and an automated driving system. The steering assembly includes a steering wheel and a steering mechanism selectively engaged to the steering wheel. In an engaged state, the steering mechanism is engaged to the steering wheel. In a disengaged state, the steering mechanism is disengaged from the steering wheel. The automated driving system is coupled to the steering assembly. The automated driving system includes a storage device with instructions and a processor coupled to the storage device. When the instructions are executed by the processor, the instructions configure the processor to set an operational state of the automated driving system, and set, based on the operational state, an engagement state of the steering wheel to the steering mechanism.

One or more embodiments describe a non-transitory computer-readable storage medium including instructions that, when executed by a processor, cause the processor to set an engagement state of a steering wheel in a steering system. To do so, the processor performs the following steps: determining, by the processor, an operational state of an automated driving system in the steering system; and setting, by the processor, the engagement state of the steering wheel based on the operational state of the automated driving system.

DETAILED DESCRIPTION

One or more embodiments are disclosed herein. The one or more embodiments are exemplary embodiments. It is understood that the figures are not necessarily to scale. As such, some features may be exaggerated or minimized to show details of one or more components. It is further understood that specific structural and functional details disclosed herein are not to be interpreted as limiting, but instead as exemplary.

One or more embodiments may include hardware and software to perform specified processes, such as to achieve certain functionality. One or more embodiments may include one or more circuits or other electrical devices. The circuits, the other electrical devices, the processes, and the functionality thereof is not intended to be limited to the illustrations or descriptions herein. While particular labels herein may be assigned to the circuits or the other electrical devices, such labels are not intended to limit the scope of operation of the circuits or the other electrical devices. Such circuits and other electrical devices may be combined with each other or otherwise separated. It is recognized that any circuit or other electrical device disclosed herein may include any number of microcontrollers, processors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software, which may co-act with one another to perform any operation or to achieve any functionality, as disclosed herein. In addition, any one or more of the electrical devices may be configured to execute a computer-program that may be embodied in a non-transitory computer readable medium that may be programmed to perform any operation and or to achieve any functionality, as disclosed herein.

Figure 1:
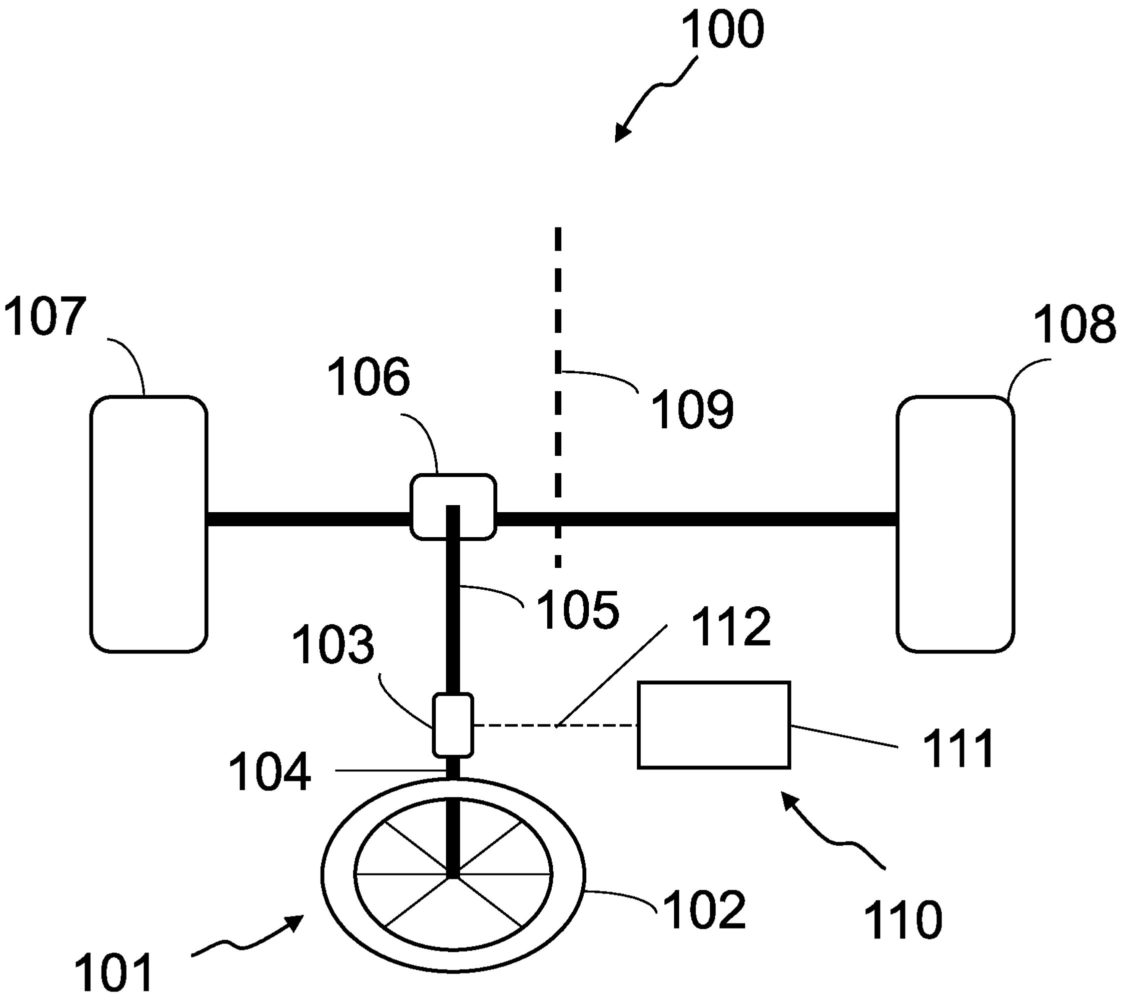
FIG. 1 illustrates a schematic view of a steering system, which is in accordance with one or more embodiments.

In accordance with one or more embodiments, FIG. 1 illustrates a schematic view of a steering system 100 for a vehicle. The steering system 100 includes a steering assembly 101. The steering assembly 101 includes a steering wheel 102. The steering wheel 102 is selectively engaged to a coupling device 103. The coupling device 103 may for example be a mechanical assembly, a hydraulic assembly, a pneumatic assembly, or an electromagnetic assembly.

The steering wheel 102 may attach to an upper shaft 104. The upper shaft 104 may be selectively engaged to the coupling device 103. The coupling device 103 may be attached to a steering shaft 105. In relation to the upper shaft 104, the steering shaft 105 may be distal to the steering wheel 102. Similarly, in relation to the steering shaft 105, the upper shaft 104 may be proximal to the steering wheel 102. The steering shaft 105 may be attached to a steering mechanism 106.

The steering mechanism 106 may be attached to a wheel 107. The steering mechanism 106 may be attached to an additional wheel 108. The steering mechanism 106 may control orientations of the wheel 107 and the additional wheel 108, particularly angular orientations relative to a centerline 109. The centerline 109 may equally bisect the steering assembly between the wheel 107 and the additional wheel 108. For example, the centerline 109 may equally bisect a distance between the wheel 107 and the wheel 108. The centerline 109 may be a centerline of a vehicle.

In FIG. 1, for example, the wheel 107 is oriented parallel to the centerline 109. Similarly, the additional wheel 108 is oriented parallel to the centerline 109. In other examples, the steering mechanism 106 may cause the wheel 107 to be oriented at an angle to the centerline 109, such that a line extending from the wheel 107 would intersect the centerline 109. The angle of the wheel 107 may be between an angular range. The angular range for the wheel 107 may include a minimum angle and a maximum angle. The wheel 107 may therefore rotate between the angular range for the wheel 107. This rotation within the angular range for the wheel 107 may be about an axis corresponding to the wheel 107. Similarly, the steering mechanism 106 may cause the additional wheel 108 to be oriented at an angle to the centerline 109, such that a line extending from the additional wheel 108 would intersect the centerline 109. The angle of the additional wheel 108 may be between an angular range. The angular range for the additional wheel 108 may include a minimum angle and a maximum angle. The additional wheel 108 may therefore rotate between the angular range for the additional wheel 108. This rotation within the angular range for the additional wheel 108 may be about an axis corresponding to the additional wheel 108.

In one example, the steering mechanism 106 may cause the wheel 107 to turn independent from the additional wheel 108. In another example, the steering mechanism 106 may cause the additional wheel 108 to turn independent from the wheel 107. This may result in an angle of the wheel 107 relative to the centerline 109 being different from an angle of the additional wheel 108 relative to the centerline 109. In another example, the steering mechanism 106 may cause the wheel 107 and the additional wheel 108 to turn in unison relative to the centerline 109. This may result in an angle of the wheel 107 relative to the centerline 109 being equal to an angle of the additional wheel 108 relative to the centerline 109. In a vehicle, therefore, the steering mechanism 106 may control turning to the left, heading straight, or turning to the right. The steering mechanism 106 may include a steering gearbox. Alternatively, the steering mechanism 106 may include a rack and pinion. The steering mechanism 106 may include a power steering assembly. The steering mechanism 106 may attach to a suspension of a vehicle. The steering mechanism 106 may attach to a frame of a vehicle. The wheel 107 may attach to a powertrain of a vehicle. Similarly, the additional wheel 108 may attach to a powertrain of a vehicle.

The coupling device 103 may include a steering power unit, such as an electric motor, for controlling the orientations of the wheel 107 and the additional wheel 108. The steering power unit may rotate the steering shaft 105, such as clockwise or counterclockwise. In turn, this rotation may change the orientations of the wheel 107 and the additional wheel 108. In a vehicle, therefore, the steering power unit may control turning to the left, heading straight, or turning to the right.

In FIG. 1, the steering assembly 101 is shown coupled to an automated driving system 110. The steering assembly 101 may be coupled to the automated driving system 110 via a wired connection or a wireless connection. The wired connection for example may utilize Ethernet technology and protocols, USB technology and protocols, or other wired networking technology and protocols. The wireless connection may utilize transceivers, receivers, and/or transmitters. The wireless connection, for example, may utilize Wi-Fi technology and protocols, Bluetooth technology and protocols, Zigbee technology and protocols, LTE technology and protocols, 5G technology and protocols, or other wireless, cellular, or satellite networking technology and protocols.

The automated driving system 110 includes an electrical device 111. The electrical device 111 may be a computing device. The electrical device 111 may be coupled to the coupling device 103 via connection 112. The connection 112 may be a wired connection or a wireless connection. The connection 112 may allow data, input signals, and other information to pass from the electrical device 111 to the coupling device 103. The connection 112 may allow data, input signals, and other information to pass from the coupling device 103 to the electrical device 111. The electrical device may be powered by a power source, such as a battery. The coupling device 103 may be powered by a power source. The electrical device 111 may power the coupling device 103 via the connection 112. Alternatively, the coupling device 103 may power the electrical device 111. The connection 112 may include a data line. The connection 112 may include a powerline.

Figure 2:
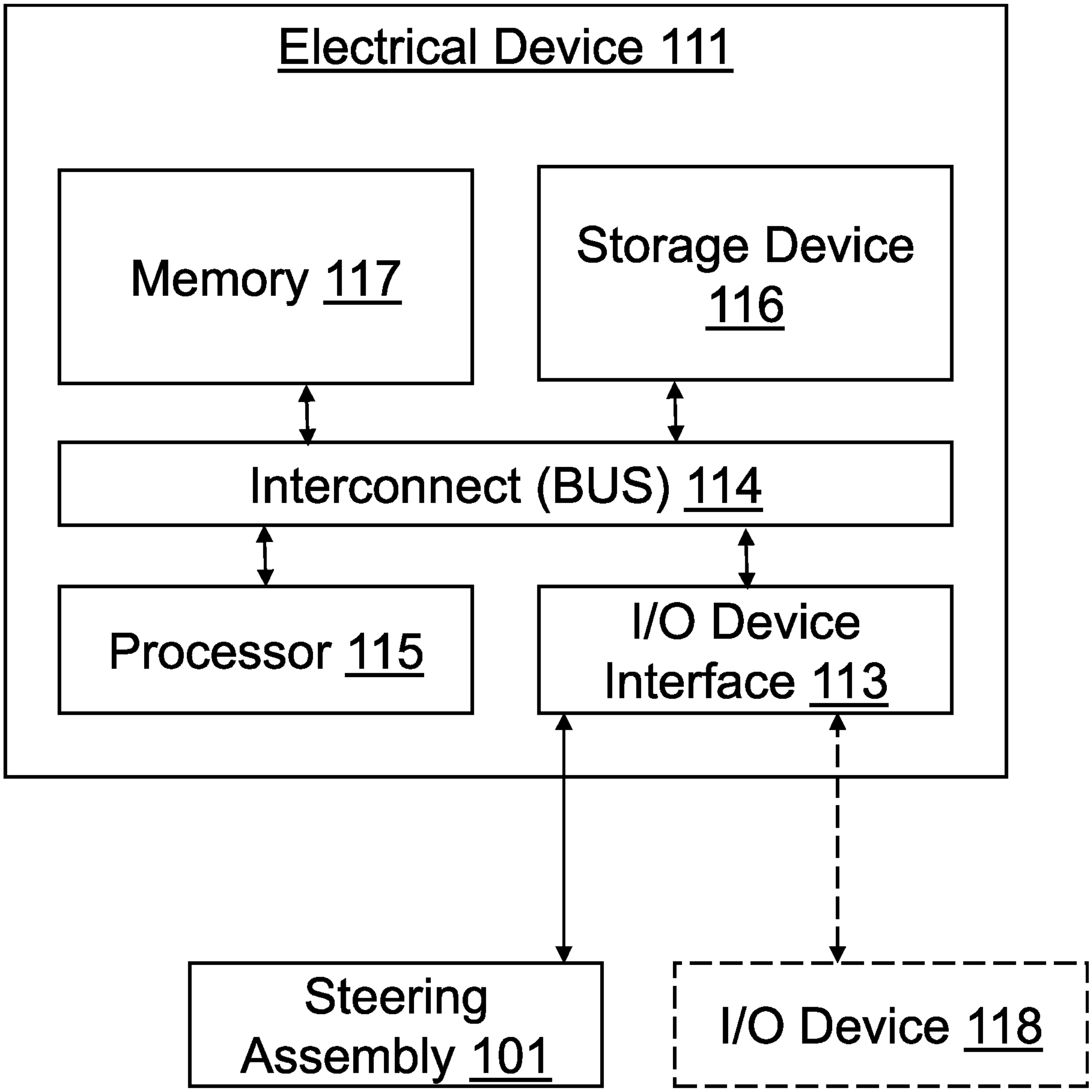
FIG. 2 illustrates an example of a block diagram of the steering system in FIG. 1.

In accordance with one or more embodiments, FIG. 2 illustrates an example of a block diagram of the steering system 100 in FIG. 1. In FIG. 2, for example, the electrical device 111 includes an I/O (input/output) device interface 113. The I/O Device interface 113 may be coupled to the steering assembly 101, which may be through connection 112. In FIG. 2, as shown, the steering assembly 101 and the I/O device interface 113 are able to transmit and receive signals between one another. In FIG. 2, for example, the electrical device 111 includes an interconnect (BUS) 114. The interconnect (BUS) 114 may be coupled to the I/O device interface 113. In FIG. 2, as shown, the I/O device interface 113 and the interconnect (BUS) 114 are able to transmit and receive signals between one another. In FIG. 2, for example, the electrical device 111 includes a processor 115. The processor 115 may be coupled to the interconnect (BUS) 114. In FIG. 2, as shown, the processor 115 and the interconnect (BUS) 114 are able to transmit and receive signals between one another. In FIG. 2, for example, the electrical device 111 includes a storage device 116, such as a hard drive. The storage device 116 may be coupled to the interconnect (BUS) 114. In FIG. 2, as shown, the storage device 116 and the interconnect (BUS) 114 are able to transmit and receive signals between one another. In FIG. 2, for example, the electrical device 111 includes a memory 117. The storage device 116 may be coupled to the interconnect (BUS) 114. In FIG. 2, as shown, the memory 117 and the interconnect (BUS) 114 are able to transmit and receive signals between one another. In FIG. 2, for example, the electrical device 111 may be coupled to an additional I/O device 118. For example, the additional I/O device may be a smartphone, sensor array, or another electrical device. The I/O device 118 and the I/O device interface 113 may transmit and receive signals between one another.

The automated driving system 110 may perform a driving function for a vehicle. A driving function for the automated driving system 110 may be selected out of a plurality of driving functions. As such, the automated driving system 110 may be coupled to a powertrain of a vehicle. Furthermore, the automated driving system 110 may be coupled to a brake system of a vehicle. Additionally, the automated driving system 110 may include or be coupled to a navigation system and/or sensor system, such as to determine a location of a vehicle and/or identify surrounding objects. A driving function may be performed autonomously by the automated driving system. A driving function may control driving and steering a vehicle. A driving function, for example, may be to drive a vehicle from a first location to a second location. A driving function, for example, may be activated from a start of a drive, may be activated by an occupant while a vehicle is underway, or may be self-activated by the automated driving system 110, such as to take over driving from an occupant. When activated, the automated driving system may fully control driving and steering a vehicle. As such, when activated, the automated driving system may perform independent of an occupant. The automated driving system when activated may therefore not require an occupant to participate in driving or steering a vehicle. The automated driving system 110, for example, may include automated parking, such as for parallel parking a vehicle. As such, automated parking may be an example of a driving function.

The automated driving system 110 may set an operational state for the automated driving system 110. For example, the processor 115 may set the operational state of the automated driving system 110. The operational state, for example, may be an active state or a passive state. In the active state, the automated driving system 110 may perform a driving function for a vehicle. In the passive state, the automated driving system 110 may not perform a driving function for a vehicle. Instead, in the passive state, the automated driving system 110 may be dormant or simply monitoring systems or surroundings of a vehicle. In the passive state, the automated driving system 110 may still be on, but may not perform a driving function. Being on in the passive state may allow for a quicker transition to the active state than transitioning to the active state from the automated driving system 110 being off. The processor 115 may change the operational state of the automated driving system 110, such as transitioning from the passive state to the active state or the active state to the passive state. The operational state may be part of a start-up process for the automated driving system 110 or a shutdown process for the automated driving system 110.

The automated driving system 110 may set an engagement state for the steering wheel 102. For example, the processor 115 may set the engagement state of the steering wheel 102 to the steering shaft 105 through the coupling device 103. The processor 115 may therefore control the coupling device 103 based on the engagement state. The engagement state, for example, may be a disengaged state or an engaged state. In the disengaged state, the steering wheel 102 is disengaged from the steering shaft 105 through the coupling device 103. In the engaged state, the steering wheel 102 is engaged to the steering shaft 105 through the coupling device 103.

The engagement state of the steering wheel 102 may be based on the operational state of the automated driving system 110. For example, when the operational state of the automated driving system 110 is the active state, the engagement state of the steering wheel 102 may be the disengaged state. Similarly, when the operational state of the automated driving system 110 is the passive state, the engagement state of the steering wheel 102 may be the engaged state. Additionally, when the automated driving system 110 is off, the engagement state of the steering wheel 102 may be the engaged state. The processor 115 may change the engagement state, such as transitioning from the disengaged state to the engaged state or the engaged state to the disengaged state.

In the disengaged state, the steering wheel 102 may be disengaged from the wheel 107 and the additional wheel 108. For example, in the disengaged state, the steering wheel 102 may be disengaged from the steering shaft 105. As such, in the disengaged state, the steering wheel 102 may not cause the wheel 107 or the additional wheel 108 to change orientations, such as for turning to the right or turning to the left or returning to heading straight from a turn. Similarly, in the disengaged state, the wheel 107 and the additional wheel 108 may not cause the steering wheel 102 to rotate. In the disengaged state, the steering wheel 102 may not rotate. Instead, in the disengaged state, the steering wheel 102 may be in a locked position. The locked position may result from a locking mechanism. The locking mechanism may be coupled to the automated driving system. The locking mechanism may be in the coupling device 103 or otherwise attached to the steering wheel 102. The locking mechanism may have the locked position and an unlocked position. The steering wheel 102 may be in the unlocked position when the engagement state for the steering wheel 102 is the engaged state. Furthermore, in the disengaged state, the wheel 107 and the additional wheel 108 may change orientations independent of the steering wheel 102. In the disengaged state, the coupling device 103 independent of the steering wheel 102 may control the orientations of the wheel 107 and the additional wheel 108. For example, the coupling device may cause the steering shaft 105 to rotate, which may cause the steering mechanism 106 to change the orientations of the wheel 107 and the additional wheel 108.

Compared to a conventional automobile, the disengaged state may provide a better user experience for an occupant of a vehicle equipped with the steering system 100. The occupant may be seated near the steering wheel 102. In the disengaged state, because the steering wheel 102 may be disengaged from the wheel 107 and the additional wheel 108, the steering wheel 102 may not rotate. For example, because of the disengaged state, the automated driving system 110 may not cause the steering wheel 102 to rotate. Therefore, the automated driving system 110 may perform a driving function without rotating the steering wheel 102. Because of this, in the disengaged state, the occupant may touch the steering wheel 102 without concern that the actions by the automated driving system 110 may cause the steering wheel 102 to rotate. For example, a vehicle equipped with the steering system 100 may be going from heading straight to turning to the left, heading straight to turning to the right, returning to straight from turning to the left, or returning to straight from turning to the right. This may cause the wheel 107 and the additional wheel 108 to change orientations. However, in the disengaged state, the change in orientations of the wheel 107 and the additional wheel 108 may not be controlled by or acted upon the steering wheel 102. Because of this, in the disengaged state, the occupant's touch of the steering wheel 102 may not interfere with or otherwise compromise the automated driving system 110. Therefore, the occupant's touch of the steering wheel 102 may not inadvertently trigger a fault condition in the automated driving system 110. Additionally, in the disengaged state, the automated driving system 110 may not cause the steering wheel 102 to suddenly or unexpectedly rotate. As such, the occupant may be able to place an object on the steering wheel 102 without concern that the actions of the automated driving system 110 may cause the object to fall by rotating the steering wheel 102. Similarly, the occupant may be able to touch the steering wheel 102 without concern that the actions of the automated driving system 110 may cause the steering wheel to collide with the occupant by rotating the steering wheel 102. As such, the disengaged state may provide a positive user experience for the occupant.

The operational state set for the automated driving system 110 may be selected out of a plurality of states for the automated driving system 110. For example, the operational state of the automated driving system 110 may be a first operational state. As another example, the operational state of the automated driving system 110 may be a second operational state. The automated driving system 110 may transition from the first operational state to the second operational state or from the second operational state to the first operational state. The setting and transitioning may be performed by the processor 115.

As an example, in the first operational state, the engagement state of the steering wheel may be set to the disengaged state. In the first operational state, the automated driving system 110 may perform a driving function for a vehicle. In the disengaged state, the steering wheel 102 may be disengaged from the steering shaft by the coupling device 103. In the disengaged state, the steering wheel 102 may be rotationally constrained by the coupling device 103. However, the coupling device 103 may still allow the steering shaft 105 to rotate independent of the steering wheel 102. In the second operational state, the engagement state of the steering wheel 102 may be set to the engaged state. In the engaged state, the steering wheel 102 may be engaged to the steering shaft 105 through the coupling device 103. In the engaged state, the steering wheel 102 may be engaged to the steering shaft 105 through the coupling device 103. In the engaged state, the steering wheel 102 may cause the steering shaft 105 to rotate through the coupling device 103. In the engaged state, the steering wheel 102 may rotate in unison with the steering shaft 105.

Figure 3:
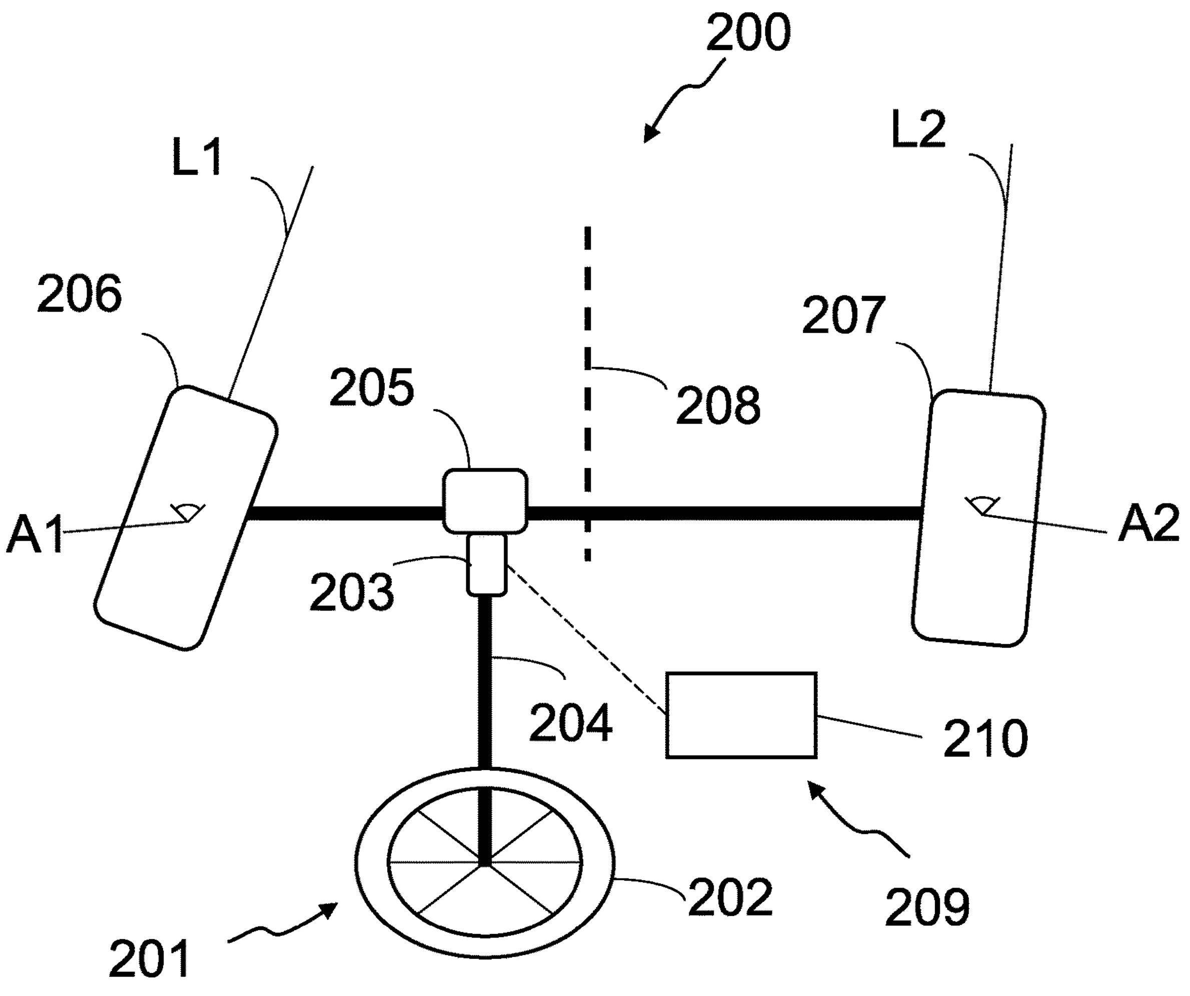
FIG. 3 illustrates a schematic view of a steering system, which is in accordance with one or more embodiments.

In accordance with one or more embodiments, FIG. 3 illustrates a schematic view of a steering system 200 for a vehicle. The steering system 200 includes a steering assembly 201. The steering assembly 201 includes a steering wheel 202. The steering wheel 202 is selectively engaged to a coupling device 203. The steering wheel 202 may attach to an elongated member 204, such as a shaft. The elongated member 204 may be selectively engaged to the coupling device 203. The coupling device 203 may be attached to a steering mechanism 205. Alternatively, the coupling device 203 may be included within the steering mechanism 205. In the alternative, the coupling device 203 is an integral part of the steering mechanism 205.

The steering mechanism 205 may be attached to a wheel 206. The steering mechanism 205 may be attached to an additional wheel 207. In one or more embodiments, the steering mechanism 205 may attach to one or more wheels. The steering mechanism 205 may control orientations of the wheel 206 and the additional wheel 207, particularly angular orientations relative to a centerline 208. For example, in FIG. 3, the wheel 206 is shown oriented at an angle to the centerline 208. Similarly, the additional wheel 207 is shown oriented at an angle to the centerline 208. The angle of wheel 206 in relation to the centerline 208 can be appreciated by extending line segment L1 and the centerline 208 at least to the point of intersection between L1 and the centerline 208. Similarly, the angle of the additional wheel 207 in relation to the centerline 208 can be appreciated by extending the line segment L2 and the centerline 208 at least to the point of intersection between L2 and the centerline 208. In FIGS. 3, L1 and L2, as shown, are not parallel to one another. As such, in FIG. 3, the angle of wheel 206 is not equal to the angle of the additional wheel 207. In alternative embodiments, L1 and L2 may be parallel to one another. Similarly, in alternative embodiments, the angle of wheel 206 and the angle of the additional wheel 207 may be equal to one another.

The wheel 206 may rotate between an angular range A1. The angular range A1 may include a minimum angle and a maximum angle. For example, the angular range of A1 may be −90 deg to +90 deg, such as for moving a vehicle laterally to the centerline 208, which may be useful in a parallel parking scenario. Alternatively, the angular range A1 may be greater than, less than, or otherwise different from −90 deg to +90 deg. The additional wheel 207 may rotate between an angular range A2. The angular range A2 may include a minimum angle and a maximum angle. For example, the angular range of A2 may be −90 deg to +90 deg, such as for moving a vehicle laterally to the centerline 208, which may be useful in a parallel parking scenario. Alternatively, the angular range A2 may be greater than, less than, or otherwise different from −90 deg to +90 deg. The angular range A1 may equal the angular range A2. Alternatively, the angular range A1 may be different from the angular range A2. The angular range A1 may be based on a local coordinate system corresponding to the wheel 206. Similarly, the angular range A2 may be based on a local coordinate system corresponding to the additional wheel 207.

The coupling device 203 may include a steering power unit for controlling the orientations of the wheel 206 and the additional wheel 207. Alternatively, the steering power unit may be included within the steering mechanism 205. The steering power unit may control rotating the wheel 206 within the angular range A1. Similarly, the steering power unit may control rotating the additional wheel 207 within the angular range 207.

In FIG. 3, the steering assembly 201 is shown, for example, coupled to an automated driving system 209. The automated driving system 209 includes an electrical device 210. The electrical device 210, for example, may be coupled to the coupling device 203 via a connection. The connection may be through a wired connection or a wireless connection.

The automated driving system 209 may set an operational state for the automated driving system 209. For example, a processor of or in communication with the automated driving system 209 may set the operational state of the automated driving system 209. The automated driving system 209 may set an engagement state for the steering wheel 202. For example, the processor may set the engagement state of the steering wheel 202 to the wheel 206 and the additional wheel 207. The engagement state of the steering wheel 202 may be based on the operational state of the automated driving system 209. The processor may control the coupling device 203 based on the engagement state. The engagement state, for example, may be a disengaged state or an engaged state. In the disengaged state, the elongated member 204 may be disengaged from the steering mechanism 205 through the coupling device 203. In the engaged state, the elongated member 204 may be engaged to the steering mechanism 205 through the coupling device 203.

In the disengaged state, the steering wheel 202 may not cause the wheel 206 or the additional wheel 207 to change orientations, such as for turning to the right or turning to the left or returning to heading straight from a turn. Similarly, in the disengaged state, the wheel 206 and the additional wheel 207 may not cause the steering wheel 202 to rotate. In the disengaged state, the steering wheel 202 may not rotate. Instead, the steering wheel 202 may be in a locked position. Furthermore, in the disengaged state, the wheel 206 and the additional wheel 207 may change orientations independent of the steering wheel 202. In the disengaged state, the coupling device 203 independent of the steering wheel 202 may control the orientations of the wheel 206 and the additional wheel 207. For example, the coupling device 203 may control the steering mechanism 205, which may change orientations of the wheel 206 and the additional wheel 207.

In the engaged state, the steering wheel 202 may cause the wheel 206 and the additional wheel 207 to change orientations relative to the centerline 208. Similarly, in the engaged state, the wheel 206 and the additional wheel 207 may cause the steering wheel 202 to rotate.

Figure 4:
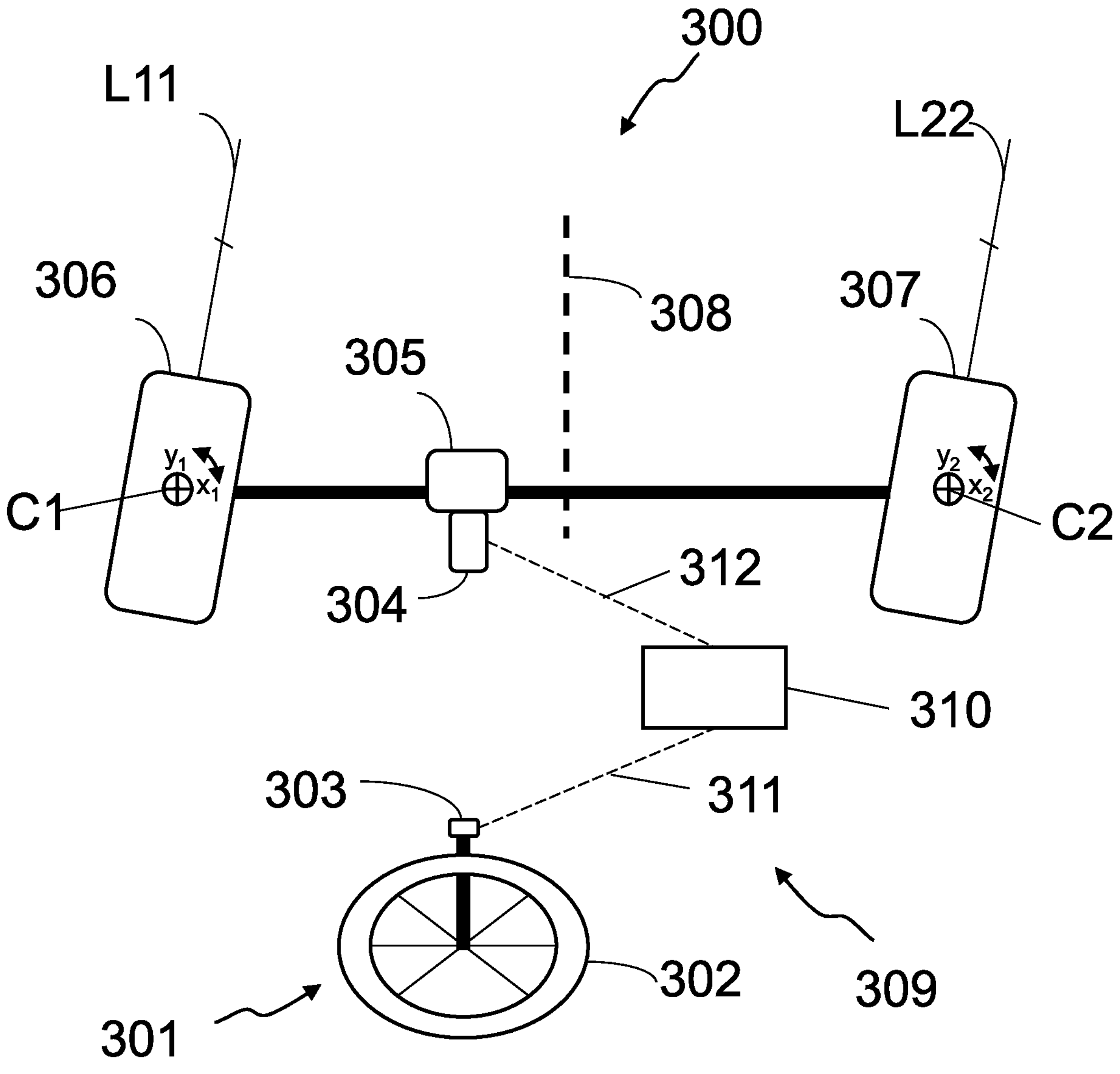
FIG. 4 illustrates a schematic view of a steering system, which is in accordance with one or more embodiments.

In accordance with one or more embodiments, FIG. 4 illustrates a schematic view of a steering system 300 for a vehicle. The steering system 300 includes a steering assembly 301. The steering assembly 301 includes a steering wheel 302. The steering wheel 302 includes a communication device 303. The communication device 303 may include a sensor. The sensor may sense an angular orientation of the steering wheel 302. The communication device may include a locking mechanism. The locking mechanism may lock the steering wheel 302. In doing so, the steering wheel may not be rotated. The locking mechanism may unlock the steering wheel 302. In doing so, the steering wheel 302 may be rotated. The steering wheel 302 may be selectively coupled to a coupling device 304. The coupling device 304 may include a communication device. The coupling device 304 may be attached to a steering mechanism 305. Alternatively, the coupling device 304 may be included within the steering mechanism 305.

The steering mechanism 305 may be attached to a wheel 306. The steering mechanism 305 may be attached to an additional wheel 307. The steering mechanism 305 may control orientations of the wheel 306 and the additional wheel 307, particularly angular orientations relative to a centerline 308. For example, in FIG. 4, the wheel 306 is shown oriented at an angle to the centerline 308. Similarly, the additional wheel 307 is shown oriented at an angle to the centerline 308. The angle of wheel 306 in relation to the centerline 308 can be appreciated by extending line segment L11 and the centerline 308 at least to the point of intersection between L11 and the centerline 308. Similarly, the angle of the additional wheel 307 in relation to the centerline 308 can be appreciated by extending the line segment L22 and the centerline 308 at least to the point of intersection between L22 and the centerline 308. In FIGS. 4, L11 and L22 are parallel to one another. As such, in FIG. 4, the angle shown of wheel 306 is equal to the angle shown of the additional wheel 307. In alternative embodiments, L11 and L22 may not be parallel to one another. Similarly, in alternative embodiments, the angle of wheel 306 and the angle of the additional wheel 307 may not be equal to one another.

The wheel 306 may include a local coordinate system C1. The local coordinate system C1 may include an x-axis X1, a y-axis, Y1, and a z-axis. In the local coordinate system C1, the x-axis X1, the y-axis Y1, and the z-axis may be aligned 90 deg to one another. The z-axis of the local coordinate system C1 extends through an intersection point of the x-axis X1 and the y-axis Y1. The wheel 306 may rotate about the z-axis in the local coordinate system C1. This rotation of the wheel 306 about the z-axis may be within an angular range.

Similarly, the additional wheel 307 may include a local coordinate system C2. The local coordinate system C2 may include an x-axis X2, a y-axis, Y2, and a z-axis. In the local coordinate system C2, the x-axis X2, the y-axis Y2, and the z-axis may be aligned 90 deg to one another. The z-axis of the local coordinate system C2 extends through an intersection point of the x-axis X2 and the y-axis Y2. The additional wheel 307 may rotate about the z-axis in the local coordinate system C2. This rotation of the additional wheel 307 about the z-axis may be within an angular range.

The coupling device 304 may include a steering power unit for controlling the orientations of the wheel 306 and the additional wheel 307. Alternatively, the steering power unit may be included within the steering mechanism 305. The steering power unit may control rotating the wheel 306 about the z-axis of the local coordinate system C1. Similarly, the steering power unit may control rotating the additional wheel 307 about the z-axis of the local coordinate system C2.

In FIG. 4, the steering assembly 301 is shown, for example, coupled to an automated driving system 309. The automated driving system 309 includes an electrical device 310. The electrical device 310 may be coupled to the communication device 303 via a first connection 311. The first connection 311 may be through a wired connection or a wireless connection. The electrical device 310, for example, may be coupled to the coupling device 304 via a second connection 312. The second connection 312 may be through a wired connection or a wireless connection.

The steering wheel 302 may selectively control the coupling device 304 through the electrical device 310. The steering wheel 302 may not be in direct mechanical attachment with the coupling device 304. Instead, the steering wheel 302 may be in a fly-by-wire connection with the coupling device 304 through the electrical device 310. While the steering wheel 302 may not be mechanically attached to the coupling device 304, the steering wheel 302 may be electrically connected or wirelessly connected to the coupling device 304, such as through the electrical device 310.

The automated driving system 309 may set an operational state for the automated driving system 309. For example, a processor of or in communication with the automated driving system 309 may set the operational state of the automated driving system 309. The automated driving system 309 may set an engagement state for the steering wheel 302. For example, the processor may set the engagement state of the steering wheel 302 to the wheel 306 and the additional wheel 307. The engagement state of the steering wheel 302 may be based on the operational state of the automated driving system 309. The processor may control the steering wheel 302 through the communication device 303. The processor may control the coupling device 304 based on the engagement state. The engagement state, for example, may be a disengaged state or an engaged state. In the disengaged state, the steering wheel 302 may not control the steering mechanism 305. In the engaged state, the steering wheel 304 may control the steering mechanism 305 through the coupling device 304 and the electrical device 310.

In the disengaged state, the steering wheel 302 may not cause the wheel 306 or the additional wheel 307 to change orientations, such as for turning to the right or turning to the left or returning to heading straight from a turn. Similarly, in the disengaged state, the wheel 306 and the additional wheel 307 may not cause the steering wheel 302 to rotate. In the disengaged state, the steering wheel 302 may not rotate. Instead, the steering wheel 302 may be in a locked position. Furthermore, in the disengaged state, the wheel 306 and the additional wheel 307 may change orientations independent of the steering wheel 302. In the disengaged state, the coupling device 304 independent of the steering wheel 302 may control the orientations of the wheel 306 and the additional wheel 307. For example, the coupling device 304 may control the steering mechanism 305, which may change orientations of the wheel 306 and the additional wheel 307.

Upon activation of the disengaged state, such as transitioning from the engaged state, the electrical device 310 may receive from the first connection 311 position information of the steering wheel 302. The position information may include angular orientation of the steering wheel 302. For example, in a center position, the angular orientation may have a 12 o'clock position of the steering wheel 302 at 0 deg. In a non-center position, such as a turn position, the angular orientation may have the 12 o'clock position of the steering wheel 302 at a degree greater than or less than 0 deg. Additionally, the electrical device 310 may receive from the second connection 312 position information of the wheel 306 and the additional wheel 307. The position information for the wheel 306 may be based on the local coordinate system C1, which may further be based on the relation to the centerline 308. For example, the position information may indicate an angle formed by the line segment L11 on the X1 and Y1 plane. As another example, the position information may indicate a parallel state or an intersecting state (including an intersection angle) relative to the centerline 308. Similarly, the position information for the additional wheel 307 may be based on the local coordinate system C2, which may further be based on the relation to the centerline 308. The electrical device 310 may receive position information of the steering mechanism 305 in relation to the wheel 306 and the additional wheel 307. Similarly, the electrical device 310 may receive position information of the coupling device 304 in relation to the wheel 306 and the additional wheel 307.

Upon transitioning to the engaged state from the disengaged state, the electrical device may compare the position information of the steering wheel 302 to the position information of the wheel 306, the additional wheel 307, the steering mechanism 305, the coupling device 304, or a combination thereof. For example, the electrical device 310 may control the wheel 306 and the additional wheel 307 to transition to a home position. The home position may coincide with the activation of the disengaged state. The home position may be a default position. The default position, for example, may have the wheel 306 and the additional wheel 307 oriented parallel to the centerline 308. Additionally, in the default position, the steering wheel 302 may be in the center position. The home position may correspond to the position information for the steering wheel 302. In transitioning to the home position, the wheel 306 and the additional wheel 307 may align with the angular orientation of the steering wheel 302. Through aligning the wheel 306 and the additional wheel 307 to the angular orientation of the steering wheel 302, an occupant that takes over driving in the engaged state may have a positive user experience. Because of the alignment, the angular orientation of the steering wheel 302 may correspond to the orientations of the wheel 306 and the additional wheel 307. In doing so, the steering wheel 302 may not appear to be performing one action (such as a turn) while in reality the wheel 306 and the additional wheel 307 are oriented for performing another action (such as to travel straight ahead).

As another example, as part of the transition from the disengaged state to the engaged state, the electrical device 310 may selectively control the steering wheel 302. This may include rotating the steering wheel 302 so that the angular orientation of the steering wheel 302 may align with the orientation of the wheel 306 and the additional wheel 307 upon completion of the transition to the engaged state. For rotating the steering wheel 302 during the transition to the engaged state, the steering wheel 302 may include an electric motor or other power unit that may be coupled to the electrical device 310. Prior to rotating the steering wheel 302 in the transition, the electrical device may provide an audible alert, such as through an audio system, or a visual alert, such as through a display system. This may afford an occupant an opportunity to prepare for the selective control and transition to the engaged state. Except for the limited transition example, in the disengaged state, the electrical device 310 may not control the steering wheel 302.

In the engaged state, the steering wheel 302 may cause the wheel 306 and the additional wheel 307 to change orientations relative to the centerline 308. Similarly, in the engaged state, the wheel 306 and the additional wheel 307 may cause the steering wheel 302 to rotate.

Figure 5:
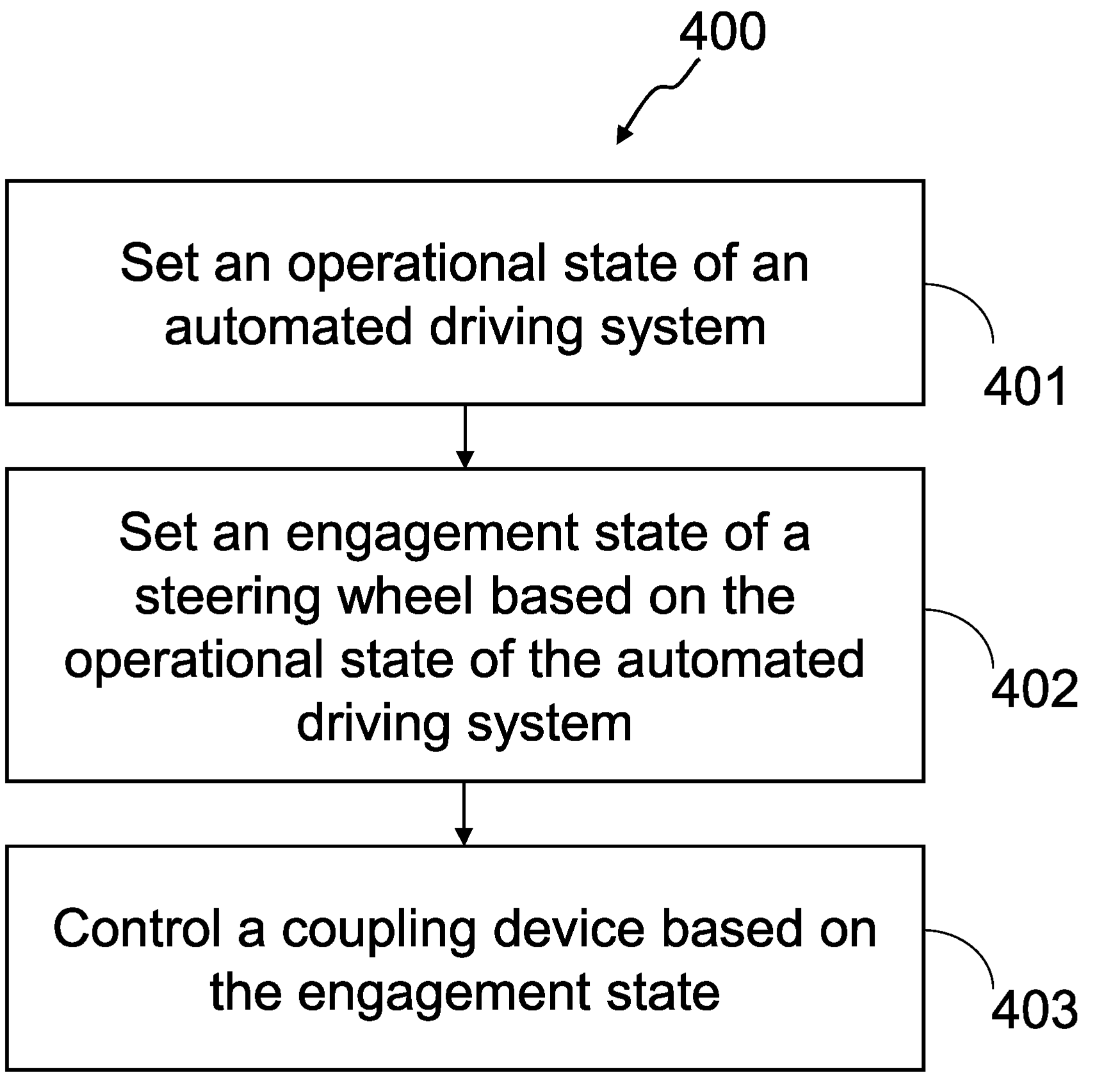
FIG. 5 illustrates a method of setting an engagement state of a steering wheel in a steering system, which is in accordance with one or more embodiments.

In accordance with one or more embodiments, FIG. 5 illustrates a method 400 of setting an engagement state of a steering wheel in a steering system. The method 400 may be performed by an automated driving system. For example, a processor of or in communication with the automated driving system may perform the method 400. The method 400 includes step 401, which sets an operational state of the automated driving system. The method 400 includes step 402, which sets an engagement state of a steering wheel based on the operational state of the automated driving system. The method 400 includes step 403, which controls a coupling device based on the engagement state. For example, through step 403, based on the engagement state, the steering wheel may be engaged to or disengaged from a steering mechanism through the coupling device.

Figure 6:
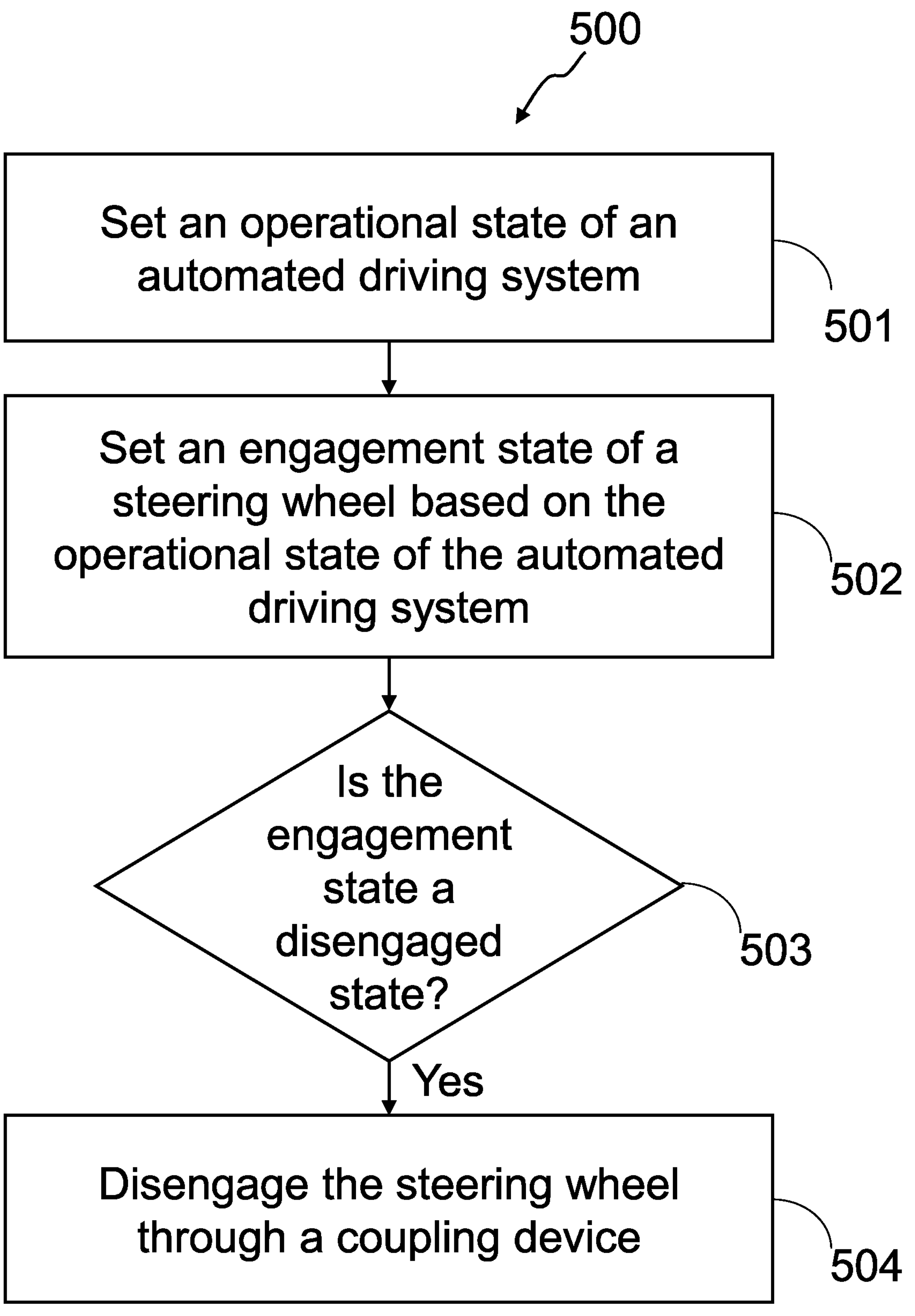
FIG. 6 illustrates a method of disengaging a steering wheel in a steering system, which is in accordance with one or more embodiments.

In accordance with one or more embodiments, FIG. 6 illustrates a method 500 of disengaging a steering wheel in a steering system. The method 500 may be performed by an automated driving system. For example, a processor of or in communication with the automated driving system may perform the method 500. The method 500 includes step 501, which sets an operational state of the automated driving system. Alternatively, step 501 may determine the operational state of the automated driving system. The method 500 includes step 502, which sets an engagement state of a steering wheel based on the operational state of the automated driving system. The method includes step 503, which determines whether the engagement state is a disengaged state. In the disengaged state, the method 500 includes step 504, which disengages the steering wheel through a coupling device. For example, step 504 may disengage the steering wheel from a steering mechanism through the coupling device. In step 503, for example, if the determination is that the engagement state is not a disengaged state, then the steering wheel may be in an engaged state. In the engaged state, the steering wheel may be engaged through the coupling device, such as to the steering mechanism. The method 500 may repeat as the operational state of the automated driving is reset or otherwise changed.

Figure 7:
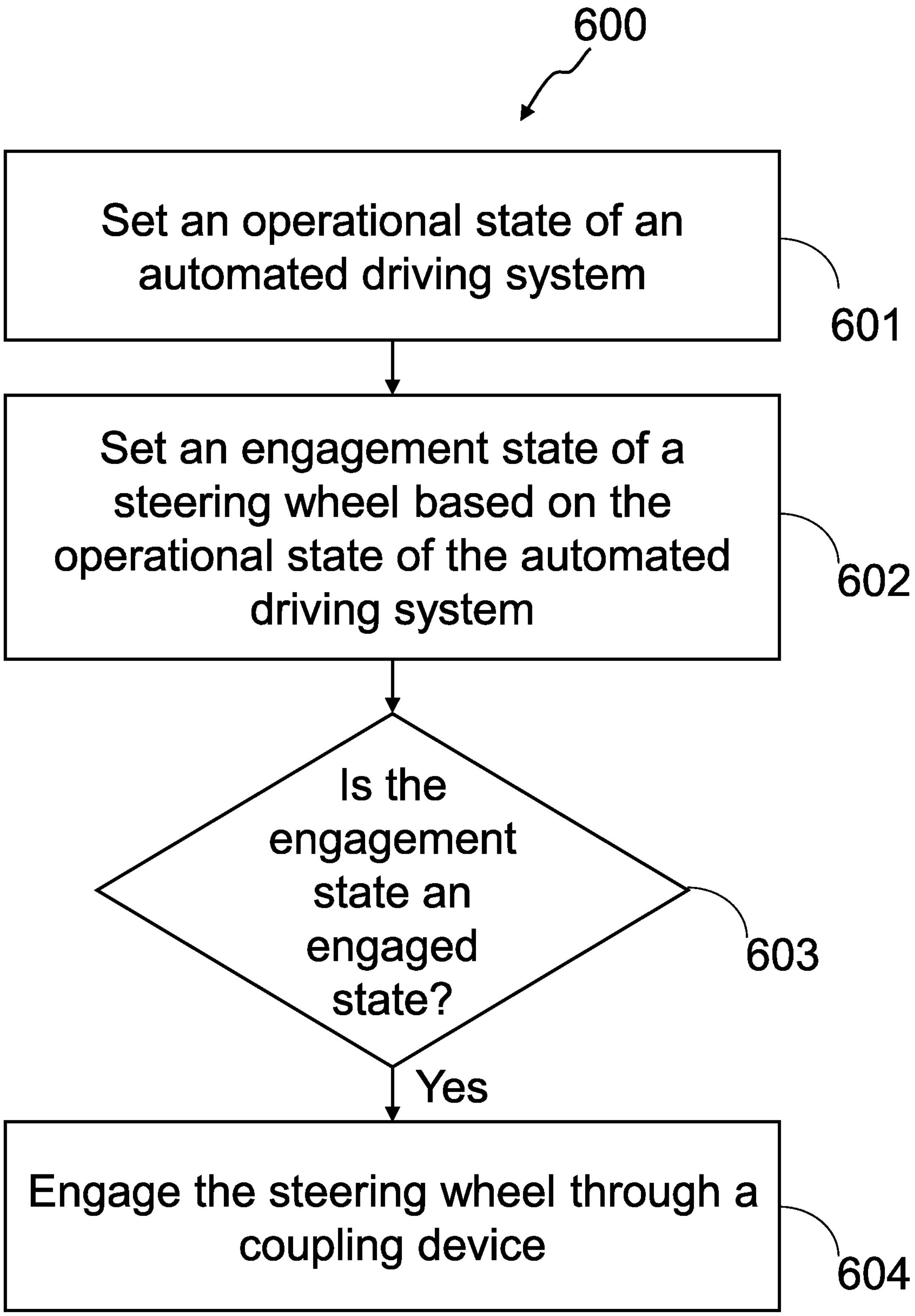
FIG. 7 illustrates a method of engaging a steering wheel in a steering system, which is in accordance with one or more embodiments.

In accordance with one or more embodiments, FIG. 7 illustrates a method 600 of engaging a steering wheel in a steering system. The method 600 may be performed by an automated driving system. For example, a processor of or in communication with the automated driving system may perform the method 600. The method 600 includes step 601, which sets an operational state of the automated driving system. Alternatively, step 601 may determine the operational state of the automated driving system. The method 600 includes step 602, which sets an engagement state of a steering wheel based on the operational state of the automated driving system. The method includes step 603, which determines whether the engagement state is an engaged state. In the engaged state, the method 600 includes step 604, which engages the steering wheel through a coupling device. For example, step 604 may engage the steering wheel to a steering mechanism through the coupling device. In step 603, for example, if the determination is that the engagement state is not an engaged state, then the steering wheel may be in a disengaged state. In the disengaged state, the steering wheel may be disengaged through the coupling device, such as from the steering mechanism. The method 600 may repeat as the operational state of the automated driving is reset or otherwise changed.

Figure 8:
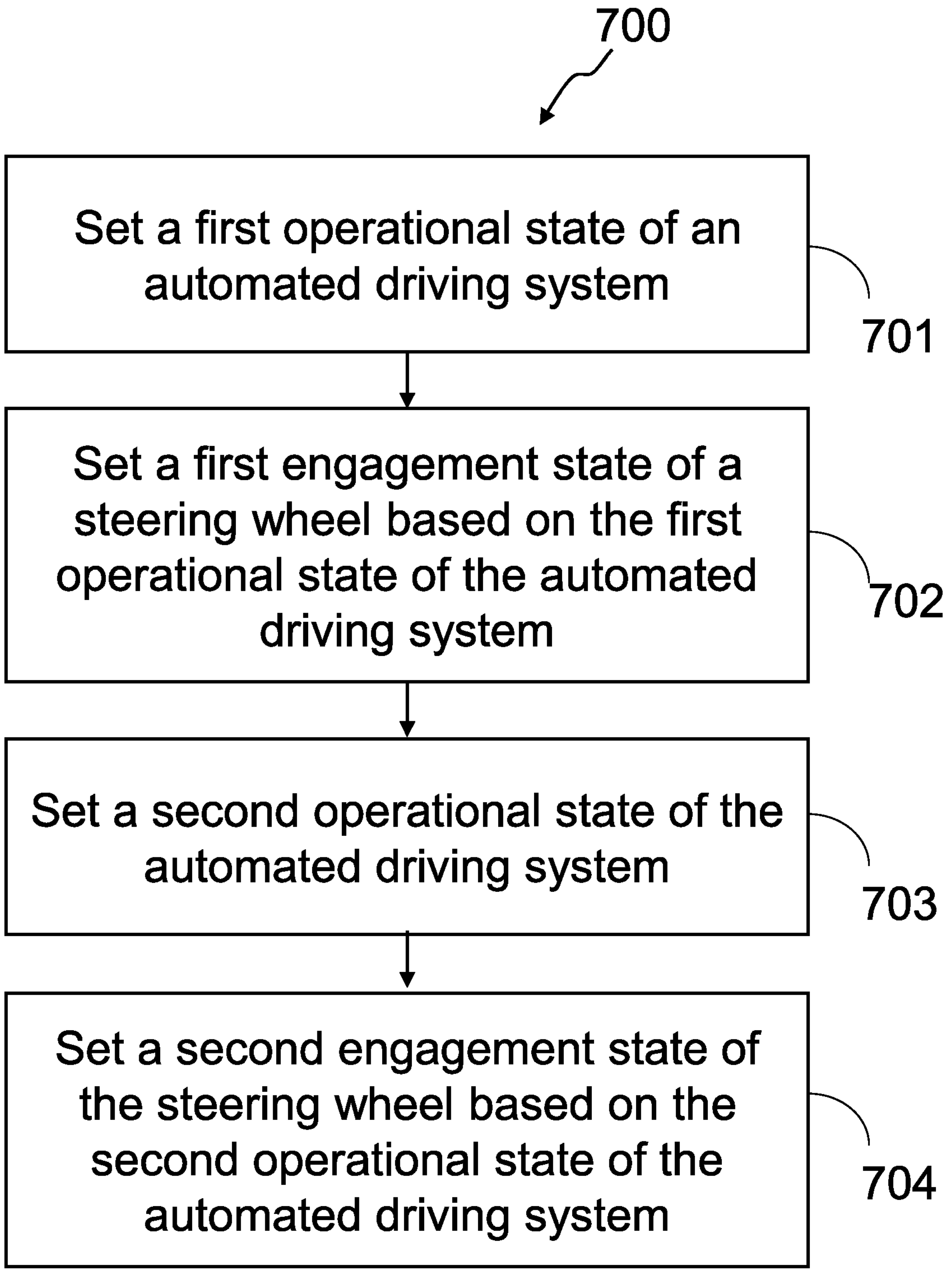
FIG. 8 illustrates a method of setting engagement states of a steering wheel in a steering system, which is in accordance with one or more embodiments.

In accordance with one or more embodiments, FIG. 8 illustrates a method 700 of setting engagement states of a steering wheel in a steering system. The method 700 may be performed by an automated driving system. For example, a processor of or in communication with the automated driving system may perform the method 700. The method 700 includes step 701, which sets a first operational state of the automated driving system. The method 700 includes step 702, which sets a first engagement state of a steering wheel based on the first operational state of the automated driving system. The method includes step 703, which sets a second operational state of the automated driving system. The second operational state may be different from the first operational state. The second operational state may supersede or otherwise be in place of the first operational state. The method includes step 704, which states a second engagement state of the steering wheel based on the second operational state of the automated driving system. The second engagement state may be different from the first engagement state. The second engagement state may supersede or otherwise be in place of the first engagement state. The method 700 may continue for additional operational states, which may in turn set additional engagement states. The method 700 may reset back to first operational state, the second operational state, or an additional operational state. This may result in setting an engagement state based on the reset operational state.

Figure 9:
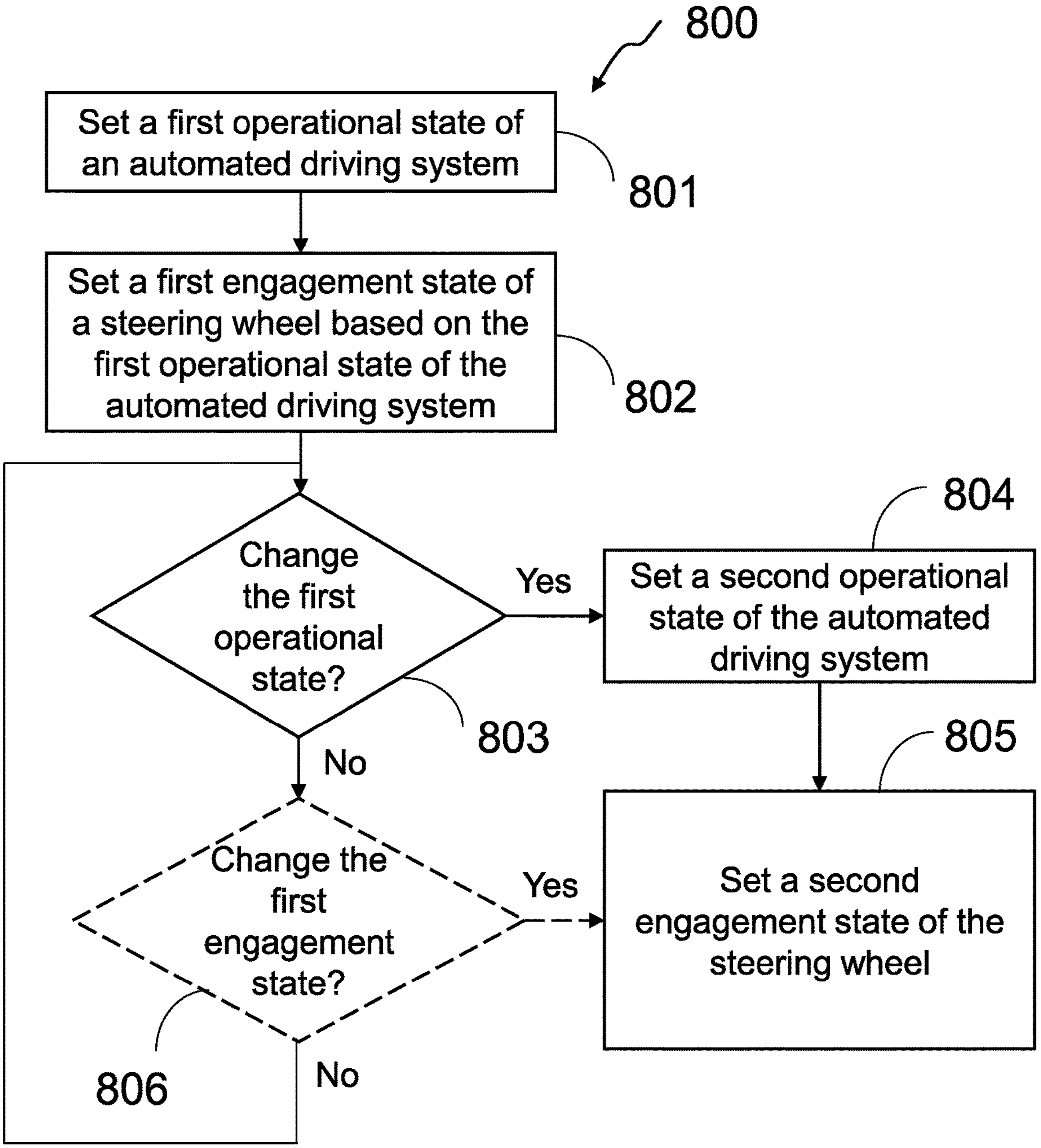
FIG. 9 illustrates a method of setting engagement states of a steering wheel in a steering system, which is in accordance with one or more embodiments.

In accordance with one or more embodiments, FIG. 9 illustrates a method 800 of setting engagement states of a steering wheel in a steering system. The method 800 may be performed by an automated driving system. For example, a processor of or in communication with the automated driving system may perform the method 800. The method 800 includes step 801, which sets a first operational state of the automated driving system. The method 800 includes step 802, which sets a first engagement state of a steering wheel based on the first operational state of the automated driving system. The method 800 includes step 803, which determines whether to change from the first operational state. In response to a determination to change the first operational state, the method includes step 804, which sets a second operational state of the automated driving system. The second operational state may be different from the first operational state. The second operational state may supersede or otherwise be in place of the first operational state. The method 800 includes the step 805, which sets a second engagement state of the steering wheel. The second engagement state may be based on the second operational state. In response to a determination in step 803 to maintain the first operational state, the method 800 may be in a loop around step 803. Alternatively, the determination to maintain in step 803 may end the method 800. Optionally, the method 800 includes step 806, which determines whether to change the first engagement state in response to a determination in step 803 to maintain the first operational state. In response to a determination to change the first engagement state, the method 800 may perform step 805, which may change from the first engagement state to the second engagement state. For example, in the event that an occupant wants to override the first engagement state, the occupant may do so via step 806, such as through an interface of or in communication with the automated driving system. In the event that the determination in step 806 is to maintain the first engagement state, the method 800 may be in a loop back to step 803. Alternatively, the determination to maintain in step 806 may end the method 800.

Figure 10:
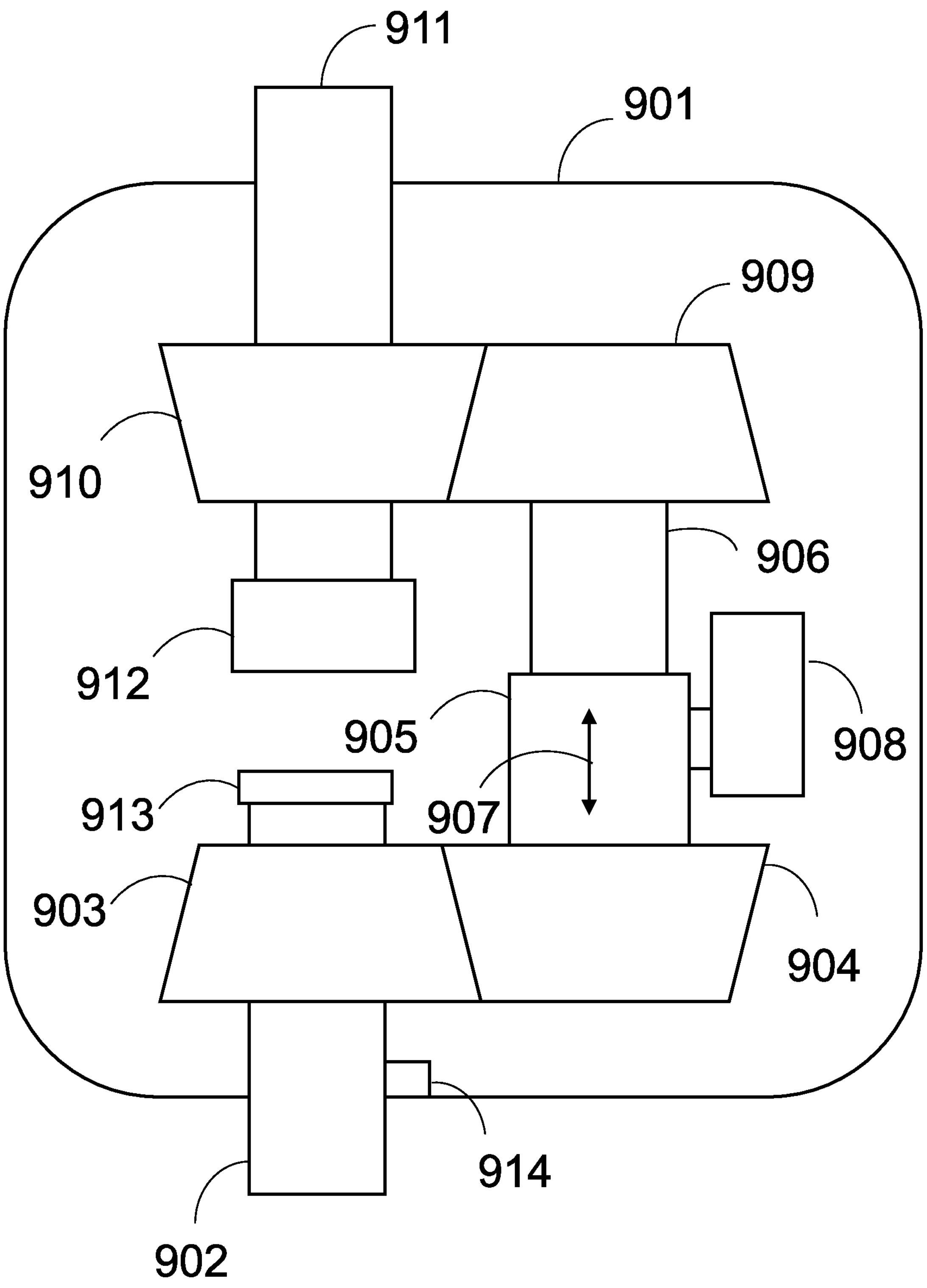
FIG. 10 illustrates a sectional view of a coupling device in a steering assembly of a steering system, which is in accordance with one or more embodiments.

In accordance with one or more embodiments, FIG. 10 illustrates a sectional view of a coupling device 901 in a steering assembly of a steering system. The coupling device 901 may include a mechanical assembly, a hydraulic assembly, a pneumatic assembly, an electromagnetic assembly, or a combination thereof. The coupling device 901 may receive or include an input shaft 902. The input shaft 902 may be an upper shaft or an elongated member. The input shaft 902 may be attached to a steering wheel. The input shaft 902 may include an input gear 903. The input gear 903 may be selectively engaged to an engagement gear 904.

The engagement gear 904 may be attached to a sleeve 905. The sleeve 905 may be slidably attached to a countershaft 906. Therefore, the sleeve 905 may move longitudinally along the countershaft 906, as indicated by arrows 907. The sleeve 905 may therefore cause the engagement gear 904 to longitudinally move along the countershaft 906. For example, the sleeve 905 may move longitudinally from a first position to a second position along the countershaft 906. Similarly, the sleeve 905 may move from the second position to the first position. The first position, for example, may engage the engagement gear 904 with the input gear 903, as shown in FIG. 10. Engaging the engagement gear 904 with the input gear 903 may result in an engaged state for a steering wheel. The second position, for example, may disengage the engagement gear 904 from the input gear 903. Disengaging the engagement gear 904 from the input gear 903 may result in a disengaged state for a steering wheel. The sleeve 905 may be coupled to an actuator 908. The actuator 908 may control longitudinally moving the sleeve 905 along the countershaft 906. In turn, this may control longitudinally moving the engagement gear 904 along the countershaft 906. The actuator 908, for example, may be coupled to an automated driving system. The actuator 908 may be coupled to or include a power source.

The countershaft 906 may include a secondary gear 909. The secondary gear 909 may be engaged to an output gear 910. The output gear 910 may be attached to an output shaft 911. The output shaft 911 may be attached to or part of a steering mechanism. The output shaft 911 may be a steering shaft. The output shaft 911 may be attached to a steering power unit 912. The steering power unit 912 may selectively control rotating the output shaft 911, such as when the input gear 903 is disengaged from the engagement gear 904. The steering power unit 912 may be coupled to an automated driving system. The steering power unit 912 may be coupled to or include a power source.

Rotation of the input shaft 902 may cause the input gear 903 to rotate. When the input gear 903 is engaged to the engagement gear 904, the input gear 903 may cause the engagement gear 904 to rotate. For example, a clockwise rotation of the input gear 903 may cause a counterclockwise rotation of the engagement gear 904. When the input gear 903 is disengaged from the engagement gear 904, the input gear 903 may not cause the engagement gear 904 to rotate. Rotation of the engagement gear 904 may cause the sleeve 905, the countershaft 906, and the secondary gear 909 to rotate. For example, a clockwise rotation of the engagement gear 904 may result in a clockwise rotation of the sleeve 905, the countershaft 906, and the secondary gear 909. Rotation of the secondary gear 909 may cause the output gear 910 to rotate. For example, a counterclockwise rotation of the secondary gear 909 may cause a clockwise rotation of the output gear 910. Rotation of the output gear 910 may cause the output shaft 911 to rotate. For example, a counterclockwise rotation of the output gear 910 may result in a counterclockwise rotation of the output shaft 911. When the input gear 903 is engaged to the engagement gear 904, rotation of the input shaft 902 and rotation of the output shaft 911 may be in the same direction. For example, a clockwise rotation of the input shaft 902 may result in a clockwise rotation of the output shaft 911.

Rotation of the steering power unit 912 may cause the output shaft 911 to rotate. This may further cause the output gear 910 to rotate. For example, a clockwise rotation of the power steering unit may cause a clockwise rotation of the output shaft 911 and the output gear 910. Such rotation may occur when the input gear 903 is disengaged from the engagement gear 904. Rotation of the output gear 910 may cause the secondary gear 909 to rotate. For example, a counterclockwise rotation of the output gear 910 may cause a clockwise rotation of the secondary gear 909. Rotation of the secondary gear 909 may cause the countershaft 906, the sleeve 905, and the engagement gear 904 to rotate. For example, a clockwise rotation of the secondary gear 909 may result in a clockwise rotation of the countershaft 906, the sleeve 905, and the engagement gear 904.

In an alternative embodiment, an input gear may be directly selectively engaged to an output gear. In the alternative embodiment, when the input gear is engaged to the output gear, a rotation of the input gear may be in an opposite direction to a rotation of the output gear. For example, a clockwise rotation of the input gear may result in a counterclockwise rotation of the output gear.

As show in FIG. 10, for example, the input shaft 902 may be coupled to a power unit 913. The power unit 913 may be coupled to an automated driving system. The power unit 913 may be coupled to or include a power source. The power unit 913 may prevent the input shaft from rotating. As such, the power unit may lock the input shaft, and therefore may lock a steering wheel. The power unit may allow the input shaft to rotate or selectively rotate the input shaft, such as part of a transition process from the disengaged state to the engaged state. In the transition process, the power unit 913 may algin the input shaft 902, and therefore a steering wheel, to correspond to an angular orientation of the output shaft 903. The transition process may therefore align a steering wheel to a steering mechanism and/or one or more wheels.

As show in FIG. 10, for example, the input shaft 902 may be coupled to a power unit 913. The power unit 913 may be coupled to an automated driving system. The power unit 913 may be coupled to or include a power source. The power unit 913 may prevent the input shaft 902 from rotating. As such, the power unit 913 may lock the input shaft 902, and therefore may lock a steering wheel. The power unit 913 may allow the input shaft 902 to rotate or selectively rotate the input shaft 902, such as part of a transition process from the disengaged state to the engaged state. In the transition process, for example, the power unit 913 may algin the input shaft 902, and therefore a steering wheel, to correspond to an angular orientation of the output shaft 911. The transition process may therefore align a steering wheel to a steering mechanism and/or one or more wheels.

As show in FIG. 10, for example, the input shaft 902 may be coupled to a locking mechanism 914. The locking mechanism 914 may be coupled to an automated driving system. The locking mechanism 914 may be coupled to or include a power source. The locking mechanism 914 may prevent rotation of the input shaft 902 in a locked position. The locking mechanism 914 may allow rotation of the input shaft 902 in an unlocked position.

The locking mechanism 914 may include a retractable pin. In the locked position, the retractable pin may extend into a recess on the input shaft 902, which may prevent the input shaft from rotating. In an unlocked position, the retractable pin may be in retracted state. In the retracted state, the retractable pin may not extend into a recess on the input shaft 902, which may therefore allow the input shaft 902 to rotate. Alternatively, the locking mechanism may be a frictional brake. In the locked position, the frictional brake may contact the input shaft 902, and through a frictional force, the frictional brake may prevent the input shaft 902 from rotating. In the unlocked position, for example, the frictional brake may not contact the input shaft 902, which may therefore allow the input shaft 902 to rotate.

Figure 11:
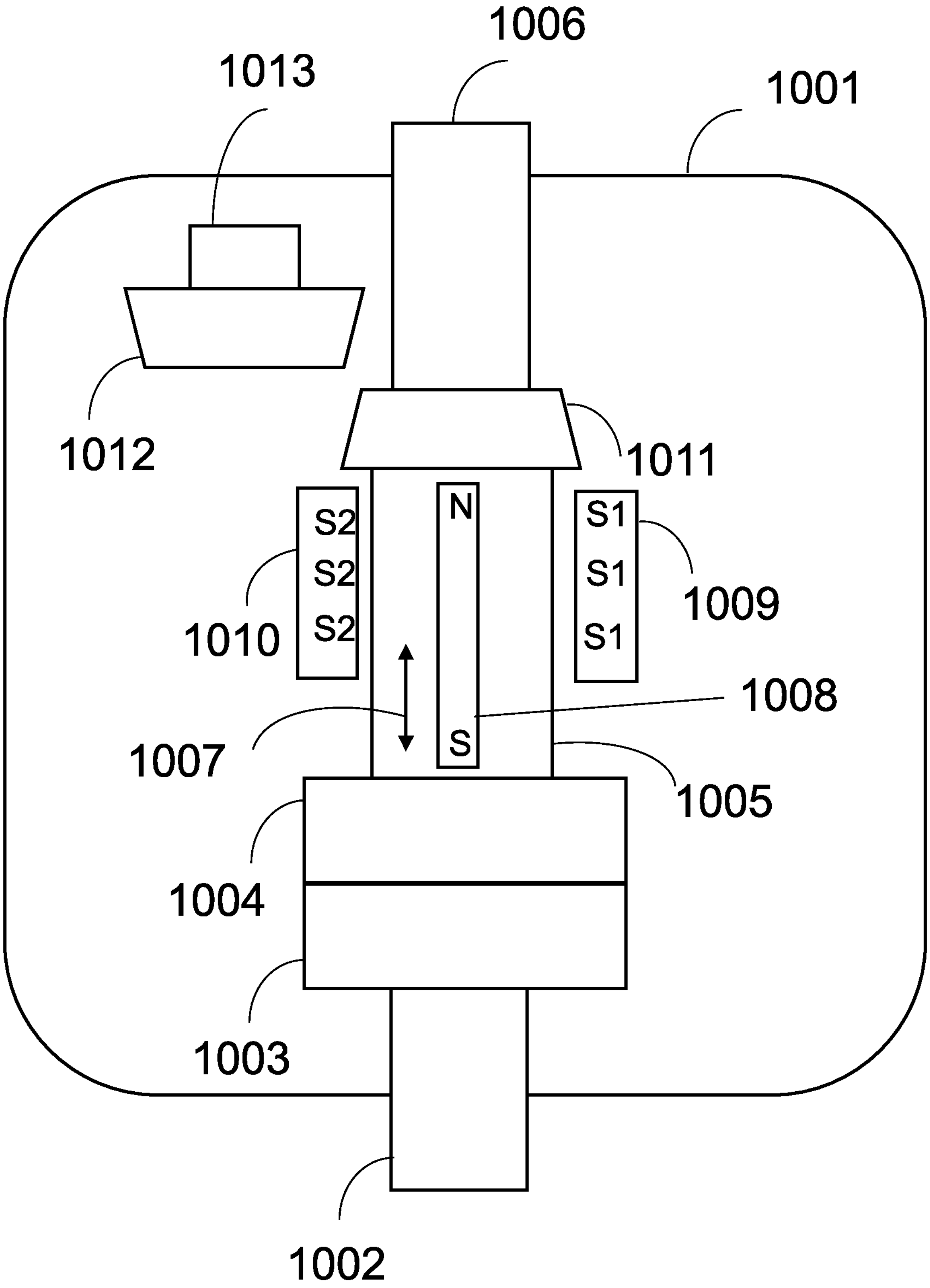
FIG. 11 illustrates a sectional view of a coupling device in a steering assembly of a steering system, which is in accordance with one or more embodiments.

In accordance with one or more embodiments, FIG. 11 illustrates a sectional view of a coupling device 1001 in a steering assembly of a steering system. The coupling device 1001 may include a mechanical assembly, a hydraulic assembly, a pneumatic assembly, an electromagnetic assembly, or a combination thereof. The coupling device 1001 may receive or include an input shaft 1002. The input shaft 1002 may be attached to a steering wheel. The input shaft 1002 may include a first connector 1003. The first connector 1003 may selectively engage a second connector 1004. When the first connector 1003 is engaged to the second connector 1004, the result is a removable coupling. The removable coupling may utilize a frictional engagement, a mechanical engagement, a hydraulic engagement, a pneumatic engagement, an electromagnetic engagement, or a combination thereof between the first connector 1003 and the second connector 1004.

The second connector 1004 may be attached to a sleeve 1005. The sleeve 1005 may be slidably attached to an output shaft 1006. Therefore, the sleeve 1005 may move longitudinally along the output shaft 1006, as indicated by arrows 1007. The sleeve 1005 may therefore cause the second connector 1004 to longitudinally move along the output shaft 1006. The sleeve 1005 may include a magnet 1008. The magnet 1008 may include a north magnetic pole N and a south magnetic pole S. The north magnetic pole N of the magnet 1008, for example, may be located distal from the second connector 1004, and the south magnetic pole S may be located proximal to the second connector 1004, as shown in FIG. 11. In an alternative embodiment, the north magnetic pole N of the magnet 1008 may be proximal to the second connector 1004, and the south magnetic pole S may be distal to the second connector 1004. The magnet 1008 may be part of a plurality of magnets on the sleeve 1005. In the plurality of magnets, like magnetic poles may be grouped proximal to one another. Each magnet in the plurality of magnets may be arranged equidistant to one another on the sleeve 1005. The coupling device may include an electromagnet 1009. The coupling device 1001 may include one or more additional electromagnets 1010. The electromagnet 1009 and the one or more additional electromagnets 1010 may be arranged equidistant to one another around the sleeve 1005. The equidistant arrangement of the electromagnet 1009 and the one or more additional electromagnets 1010 may prevent a magnetic imbalance, which may therefore prevent unintended rotation due to magnetic forces. This prevention of unintended rotation may be further achieved by the equidistant arrangement of the plurality of magnets.

The electromagnet 1009 and/or the one or more additional electromagnets 1010 may control the longitudinal movement of the sleeve 1005 along the output shaft 1006. The electromagnet 1009 and the one or more additional electromagnets 1010 may be coupled to a power source. The electromagnet 1010 and the one or more additional electromagnets 1010 may be coupled to an automated driving system. The electromagnet 1009 may set a magnetic polarity for the electromagnet 1009. In one example, the magnetic polarity for the electromagnet 1009 may be a south magnetic polarity, as shown as S1 in FIG. 11. In another example, the magnetic polarity of the electromagnet 1009 may be a north magnetic polarity. As such, the magnetic polarity of the electromagnet 1009 may switch from a first magnetic polarity to a second magnetic polarity. Similarly, the magnetic polarity of the electromagnet 1009 may switch from the second magnetic polarity to the first magnetic polarity.

Similarly to the electromagnet 1009, the one or more additional electromagnets 1010 may set a magnetic polarity for the one or more additional electromagnets 1010. For example, the magnetic polarity for the one or more additional electromagnets 1010 may be a south magnetic polarity, as shown as S2 in FIG. 11. In another example, the magnetic polarity for the one or more additional electromagnets 1010 may be a north magnetic polarity. As such, the magnetic polarity for the one or more additional electromagnets 1010 may switch from a first magnetic polarity to a second magnetic polarity. Similarly, the magnetic polarity for the one or more additional electromagnets 1010 may switch from the second magnetic polarity to the first magnetic polarity. In one example, the magnetic polarity of the electromagnet 1009 and the magnetic polarity of the one or more additional electromagnets 1010 may be the same. Alternatively, the magnetic polarity of the electromagnet 1009 and the magnetic polarity of the one or more additional electromagnets 1010 may be different. As another example, a strength of the magnetic polarity of the electromagnet 1009 and a strength of the magnetic polarity of the one or more additional electromagnets 1010 may be the same. Alternatively, a strength of the magnetic polarity of the electromagnet 1009 and a strength of the magnetic polarity of the one or more additional electromagnets 1010 may be different.

The south magnetic polarity S1 of the electromagnet 1009 may repel the south magnetic pole S of the magnet 1008. Similarly, the south magnetic polarity S1 of the electromagnet 1009 may attract the north magnetic pole N of the magnet 1008. In an alternative embodiment where the magnetic polarity of the electromagnet 1009 is a north magnetic polarity, the north magnetic polarity may attract the south magnetic pole S of the magnet 1008 and repel the north magnetic pole N of the magnet 1008. Through this attraction and repulsion between the magnetic polarity of the electromagnet 1009 and the magnet 1008, the sleeve 1005 may move longitudinally along the output shaft 1006. Similarly, through this attraction and repulsion, the second connector 1004 may engage or disengage from the first connector 1003.

The south magnetic polarity S2 of the one or more additional electromagnets 1010 may repel the south magnetic pole S of the magnet 1008. Similarly, the south magnetic polarity S2 of the one or more additional electromagnets 1010 may attract the north magnetic pole N of the magnet 1008. In an alternative embodiment where the magnetic polarity of the one or more additional electromagnets 1010 is a north magnetic polarity, the north magnetic polarity may attract the south magnetic pole S of the magnet 1008 and repel the north magnetic pole N of the magnet 1008. Through this attraction and repulsion between the magnetic polarity of the one or more additional electromagnet 1010 and the magnet 1008, the sleeve may move longitudinally along the output shaft 1006. Similarly, through this attraction and repulsion, the second connector 1004 may engage or disengage from the first connector 1003.

The output shaft 1006 may include an output gear 1011. The output gear 1011 may attach to the sleeve 1005. The electromagnet 1009 and the one or more additional electromagnets 1010 may therefore control longitudinally moving the output gear 1011 along the output shaft 1006. The output gear 1011 may selectively engage a power gear 1012. The power gear 1012 may be coupled to a steering power unit 1013. The steering power unit 1013 may be coupled to an automated driving system. The steering power unit 1013 may be coupled to or include a power source.

FIG. 11 shows, for example, the first connector 1003 engaged to the second connector 1004. Additionally, FIG. 11 shows the output gear 1011 disengaged from the power gear 1012. In an alternative embodiment, the first connector 1003 may be disengaged from the second connector 1004, and the output gear 1011 may be engaged to the power gear 1012.

When the first connector 1003 is engaged to the second connector 1004, rotation of the input shaft 1002 may cause rotation of the first connector 1003, which in turn may cause rotation of the second connector 1004. For example, a clockwise rotation of the input shaft 1002 may result in a clockwise rotation of the first connector 1003 and the second connector 1004. Rotation of the second connector 1004 may cause rotation of the sleeve 1005, the output shaft 1006, and the output gear 1011. For example, a counterclockwise rotation of the second connector 1004 may result in a counterclockwise rotation of the sleeve 1005, the output shaft 1006, and the output gear 1011. As such, when the first connector 1003 is engaged to the second connector 1004, rotation of the input shaft 1002 and the output shaft 1006 may be in the same direction.

When the power gear 1012 is engaged to the output gear 1011, rotation of the power gear 1012 may cause the output gear 1011 to rotate. For example, a clockwise rotation of the power gear 1012 may cause a counterclockwise rotation of the output gear 1011. Rotation of the output gear 1011 may cause the output shaft 1006, the sleeve 1005, and the second connection 1004 to rotate. As such, when the power gear 1012 is engaged to the output gear 1011, a rotation of the power gear 1012 may be in an opposite direction to a rotation of the output shaft 1006.

Figure 12:
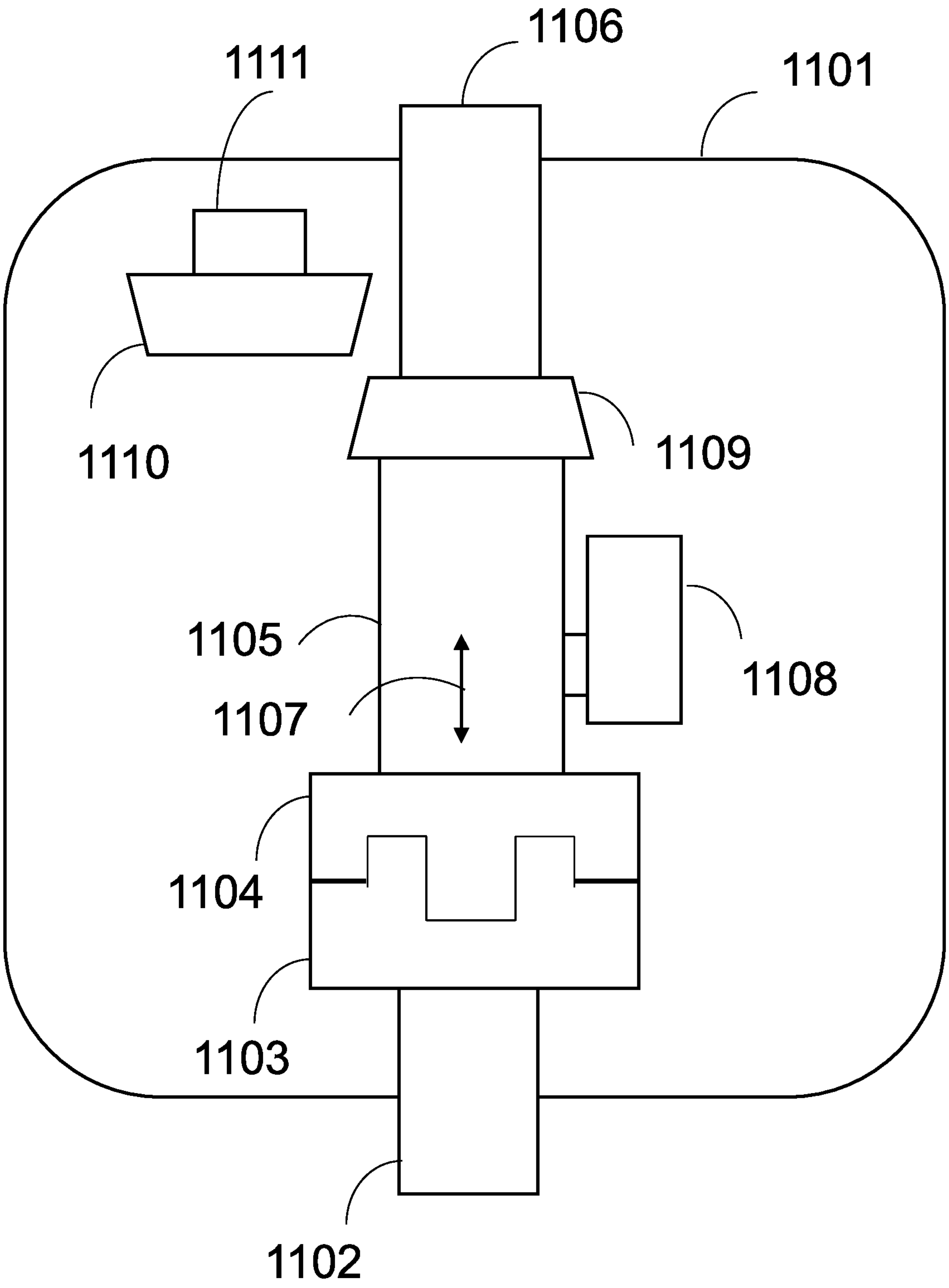
FIG. 12 illustrates a sectional view of a coupling device in a steering assembly of a steering system, which is in accordance with one or more embodiments.

In accordance with one or more embodiments, FIG. 12 illustrates a sectional view of a coupling device 1101 in a steering assembly of a steering system. The coupling device 1101 may include a mechanical assembly, a hydraulic assembly, a pneumatic assembly, an electromagnetic assembly, or a combination thereof. The coupling device 1101 may receive or include an input shaft 1102. The input shaft 1102 may be attached to a steering wheel. The input shaft 1102 may include a first connector 1103. The first connector 1103 may selectively engage a second connector 1104. When the first connector 1103 is engaged to the second connector 1104, the result is a removable coupling. The removable coupling may utilize a frictional engagement, a mechanical engagement, a hydraulic engagement, a pneumatic engagement, an electromagnetic engagement, or a combination thereof between the first connector 1103 and the second connector 1104. For example, the first connector 1103 may have teeth or other protrusions that may engage recesses of the second connector 1104. Similarly, the second connector 1104 may have teeth or other protrusions that may engage recesses of the first connector 1103.

The second connector 1104 may be attached to a sleeve 1105. The sleeve 1105 may be slidably attached to an output shaft 1106. Therefore, the sleeve 1105 may move longitudinally along the output shaft 1106, as indicated by arrows 1107. The sleeve 1105 may therefore cause the second connector 1104 to longitudinally move along the output shaft 1106. The sleeve 1105 may be coupled to an actuator 1108. The actuator 1108 may control longitudinally moving the sleeve 1105 along the output shaft 1106.

The output shaft 1106 may include an output gear 1109. The output gear 1109 may be attached to the sleeve 1105. The actuator 1108 may therefore control longitudinally moving the output gear 1109 along the output shaft 1106. The output gear 1109 may selectively engage a power gear 1110. The power gear 1110 may be coupled to a steering power unit 1111. The actuator 1108 and the steering power unit 1111 may be coupled to an automated driving system. The actuator 1108 may be coupled to or include a power source. Similarly, the steering power unit 1111 may be coupled to or include a power source.

FIG. 12 shows, for example, the first connector engaged to the second connector.

Additionally, FIG. 12 shows the output gear 1109 disengaged from the power gear 1110. In an alternative embodiment, the first connector 1103 may be disengaged from the second connector 1104, and the output gear 1109 may be engaged to the power gear 1110.

When the first connector 1103 is engaged to the second connector 1104, rotation of the input shaft 1102 may cause rotation of the first connector 1103, which in turn may cause rotation of the second connector 1104. For example, a clockwise rotation of the input shaft 1102 may result in a clockwise rotation of the first connector 1103 and the second connector 1104. Rotation of the second connector 1104 may cause rotation of the sleeve 1105, the output shaft 1106, and the output gear 1109. For example, a counterclockwise rotation of the second connector 1104 may result in a counterclockwise rotation of the sleeve 1105, the output shaft 1106, and the output gear 1109. As such, when the first connector 1103 is engaged to the second connector 1104, rotation of the input shaft 1102 and the output shaft 1106 may be in the same direction.

When the power gear 1110 is engaged to the output gear 1109, rotation of the power gear 1110 may cause the output gear 1109 to rotate. For example, a clockwise rotation of the power gear 1110 may cause a counterclockwise rotation of the output gear 1109. Rotation of the output gear 1109 may cause the output shaft 1106, the sleeve 1105, and the second connector 1104 to rotate. As such, when the power gear 1110 is engaged to the output gear 1109, a rotation of the power gear 1110 may be in an opposite direction to a rotation of the output shaft 1106.

Figure 13:
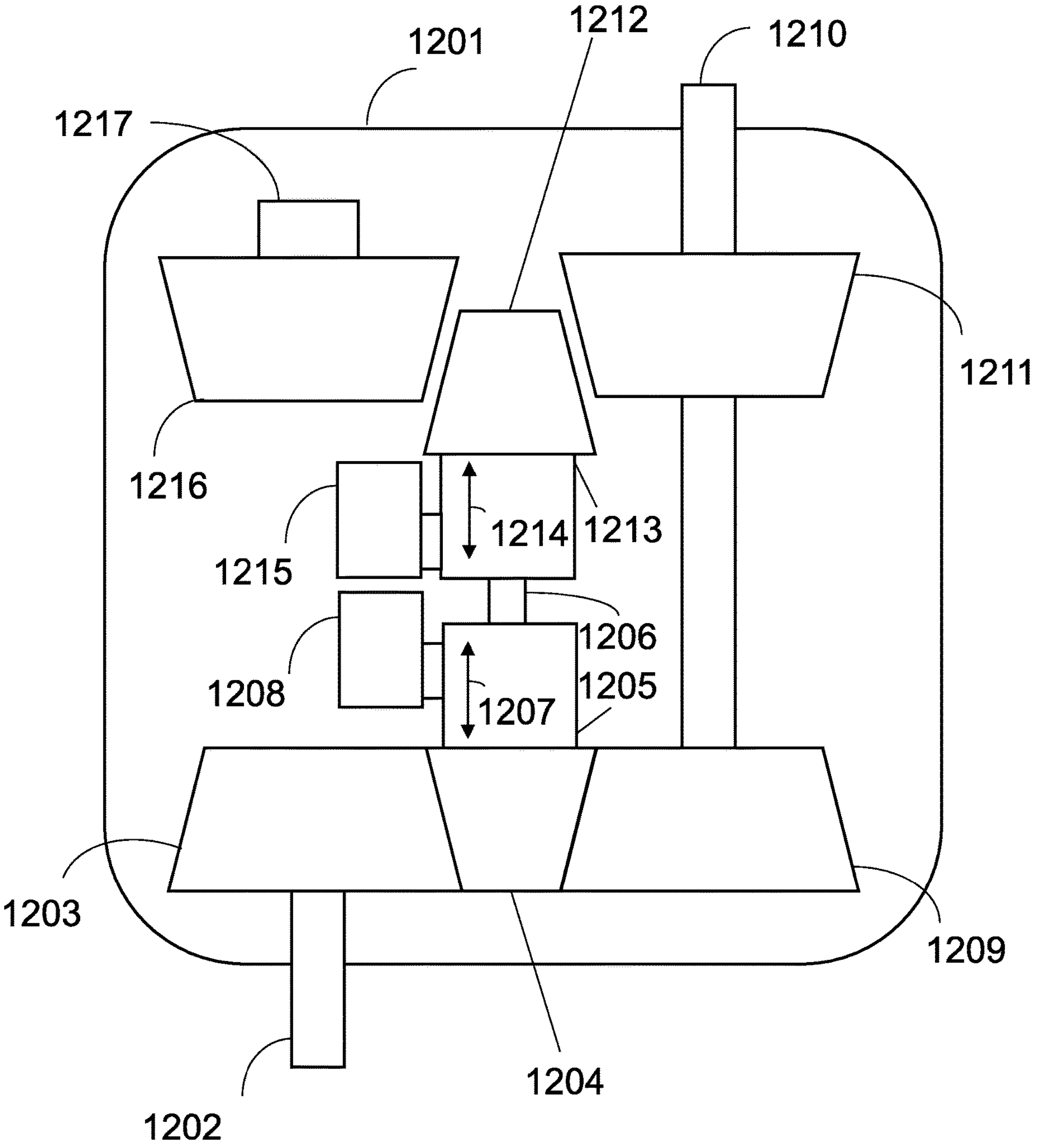
FIG. 13 illustrates a sectional view of a coupling device in a steering assembly of a steering system, which is in accordance with one or more embodiments.

In accordance with one or more embodiments, FIG. 13 illustrates a sectional view of a coupling device 1201 in a steering assembly of a steering system. The coupling device 1201 may include a mechanical assembly, a hydraulic assembly, a pneumatic assembly, an electromagnetic assembly, or a combination thereof. The coupling device 1201 may receive or include an input shaft 1202. The input shaft 1202 may be attached to a steering wheel. The input shaft 1202 may include an input gear 1203. The input gear 1203 may be selectively engaged to a first idler gear 1204. The first idler gear 1204 may be attached to a first sleeve 1205. The first sleeve 1205 may be slidably attached to a secondary shaft 1206. Therefore, the first sleeve 1205 may move longitudinally along the secondary shaft 1206, as indicated by arrows 1207. The first sleeve 1205 may therefore cause the first idler gear 1204 to longitudinally move along the secondary shaft 1206. The first sleeve 1205 may be coupled to a first actuator 1208. The first actuator 1208 may control longitudinally moving the first sleeve 1205 along the secondary shaft 1206. The first idler gear 1204 may be selectively engaged to a secondary gear 1209. The first actuator 1208 may engage the first idler gear 1204 to the input gear 1203 and the secondary gear 1209. Similarly, the first actuator 1208 may disengage the first idler gear 1204 from the input gear 1203 and the secondary gear 1209. The first actuator 1208 may be coupled to an automated driving system. The first actuator 1208 may be coupled to or include a power source.

The secondary gear 1209 may be attached to an output shaft 1210. The output shaft 1210 may include an output gear 1211. The output gear 1211 may be selectively engaged to a second idler gear 1212. The second idler gear 1212 may be attached to a second sleeve 1213. The second sleeve 1213 may be slidably attached to the secondary shaft 1206. Therefore, the second sleeve 1213 may move longitudinally along the secondary shaft 1206, as indicated by arrows 1214. The second sleeve 1213 may therefore cause the second idler gear 1212 to longitudinally move along the secondary shaft 1206. The second sleeve 1213 may be coupled to a second actuator 1215. The second actuator 1215 may control longitudinally moving the second sleeve 1213 along the secondary shaft 1206. The second idler gear 1212 may be selectively engaged to a power gear 1216. The second actuator 1215 may engage the second idler gear 1212 to the output gear 1211 and the power gear 1216. Similarly, the second actuator 1215 may disengage the second idler gear 1212 from the output gear 1211 and the power gear 1216. The second actuator 1215 may be coupled to an automated driving system. The second actuator 1215 may be coupled to or include a power source. The power gear 1216 may be coupled to a steering power unit 1217. The steering power unit 1217 may be coupled to an automated driving system. The steering power unit 1217 may be coupled to or include a power source.

FIG. 13 shows, for example, the first idler gear 1204 engaged to the input gear 1203 and the secondary gear 1209. Rotation of the input gear 1203 may cause the first idler gear 1204 to rotate. Similarly, rotation of the first idler gear 1204 may cause the secondary gear 1209 to rotate. For example, a clockwise rotation of the input gear 1203 may cause a counterclockwise rotation of the first idler gear 1204, which may result in a clockwise rotation of the secondary gear 1209. Rotation of the first idler gear 1204 may cause the first sleeve 1205, the secondary shaft 1206, the second sleeve 1213, and the second idler gear 1212 to rotate. For example, a clockwise rotation of the first idler gear 1204 may cause a clockwise rotation of the first sleeve 1205, the secondary shaft 1206, the second sleeve 1213, and the second idler gear 1212. Rotation of the secondary gear 1209 may cause the output shaft 1210 and the output gear 1211 to rotate. For example, a counterclockwise rotation of the secondary gear 1209 may result in a counterclockwise rotation of the output shaft 1210 and the output gear 1211.

When the first idler gear 1204 is engaged to the input gear 1203 and the secondary gear 1209, rotation of the input shaft 1202 and rotation of the output shaft 1210 may be in the same direction. For example, a clockwise rotation of the input shaft 1202 may result in a clockwise rotation of the output shaft 1210. Similarly, when the first idler gear 1204 is engaged to the input gear 1203 and the secondary gear 1209, and the second idler gear 1212 is engaged to the output gear 1211 and the power gear 1216, rotation of the input shaft 1202, the output shaft 1210, and the power gear 1216 may be in the same direction.

While FIG. 13 shows the second idler gear 1212 disengaged from the output gear 1211 and the power gear 1216, in an embodiment where the second idler gear 1212 is engaged to the output gear 1211 and the power gear 1216, rotation of the output gear 1211 may cause the second idler gear 1212 and the power gear 1216 to rotate. Similarly, rotation of the second idler gear 1212 may cause the power gear 1216 and the output gear 1211 to rotate. Similarly, rotation of the power gear 1216 may cause the second idler gear 1212 to rotate, which may in turn cause the output gear 1211 to rotate. For example, a clockwise rotation of the power gear 1216 may cause a counterclockwise rotation of the second idler gear 1212, which may result in a clockwise rotation of the output gear 1211. As such, when the second idler gear 1212 is engaged to the power gear 1216 and the output gear 1211, rotation of the power gear 1216 and the output shaft 1210 may be in the same direction.

In one or more embodiments, an automated driving system may be coupled to a steering assembly, such as one or more wheels, a steering mechanism, a coupling device, and/or a steering wheel. The automated driving system, as a further example, may be coupled to an engine, an electric motor, or other powertrain components in order to cause a vehicle to move, such as to accelerate a vehicle from a stopped position to a certain velocity. Similarly, the automated driving system, as another example, may be coupled to a brake system of a vehicle. The automated driving system may include a sensor, such as a camera, a LIDAR unit, a RADAR unit, or another sensing unit, to sense a surrounding of a vehicle. The sensor may be coupled to a processor of the automated driving system. The processor may receive and process an output of the sensor. Based on the output of the sensor, the automated driving system may control a vehicle to perform a driving function. For example, when a vehicle is underway, and a driving function is to alter course of the vehicle from straight ahead to a left turn, the automated driving system may cause a wheel to change from a first angular orientation to a second angular orientation, relative to a centerline of the vehicle. While the automated driving system may cause the wheel to change from the first angular orientation to the second angular orientation, the automated driving system may not cause a steering wheel to rotate.

A vehicle may be an automobile, an off-road vehicle, a vessel, an aircraft, or another type of vehicle for transporting goods or occupants. As such, in one or more embodiments, a vehicle may include a steering wheel selectively engaged to one or more wheels. It is appreciated, however, that some vehicles may use steering elements, such as one or more rudders, one or more flaps, one or more tracks, one or more sterndrives, one or more outboard motors, or one or more steering nozzles, in addition to or in place of one or more wheels. As such, in one or more other embodiments, a vehicle may include a steering wheel selectively engaged to one or more rudders, one or more flaps, one or more tracks, one or more sterndrives, one or more outboard motors, or one or more steering nozzles. For example, one or more rudders, one or more flaps, one or more tracks, one or more sterndrives, one or more outboard motors, or one or more steering nozzles may be attached to a steering mechanism. The steering wheel may be selectively engaged to the steering mechanism. For example, the steering wheel may be selectively engaged to the steering mechanism through a coupling device.

While exemplary embodiments are described above, it is not intended that these embodiments describe all possible forms of the disclosure. It is understood that various modifications and other changes may be made without departing from the spirit and scope of the disclosure. It is further understood that the features of various embodiments may be combined to form further embodiments.

What is claimed is:

1. A steering system for a vehicle, the steering system comprising:
- a steering assembly including:
  - a steering wheel;
  - a coupling device for the steering wheel; and
  - a steering shaft selectively engaged to the steering wheel through the coupling device; and
- an automated driving system coupled to the steering assembly and including:
  - a processor configured to:
    - turn the automated system to on or off;
    - when the automated driving system is off, the steering shaft is engaged to the steering wheel through the coupling device; and
    - when the automated driving system is on,
      - set an operational state of the automated driving system; and
      - set, based on the operational state, an engagement state of the steering wheel to the steering shaft through the coupling device independent of contact of the steering wheel by an occupant, wherein, when the automated driving system is on, the processor is configured to set the operational state of the automated driving system to an active state or a passive state.

2. The steering system of claim 1, wherein the automated driving system is coupled to the steering assembly through the coupling device, and the processor is further configured to control the coupling device based on the engagement state.

3. The steering system of claim 1, wherein the processor is configured to set, based on the operational state, the engagement state to a disengaged state, wherein in the disengaged state, the steering wheel is disengaged from the steering shaft through the coupling device and the steering shaft is configured through the coupling device to rotate independent of the steering wheel.

4. The steering system of claim 3, wherein the processor is configured to transition, based on the operational state, the engagement state from the disengaged state to an engaged state, for the transition, the processor is configured to rotate the steering wheel to align with an angular orientation of the steering shaft for engaging the steering wheel with the steering shaft in the engaged state.

5. The steering system of claim 1, wherein the processor is configured to set, based on the operational state, the engagement state to an engaged state, wherein in the engaged state, the steering wheel is engaged to the steering shaft through the coupling device and the steering wheel is configured through the coupling device to rotate the steering shaft.

6. The steering system of claim 1, wherein the processor is configured to set the operational state to the active state and set, based on the active state, the engagement state to a disengaged state, wherein in the disengaged state, the steering wheel is disengaged from the steering shaft through the coupling device and the steering shaft is configured to rotate independent of the steering wheel.

7. The steering system of claim 6, wherein the coupling device includes a locking mechanism that is coupled to the automated driving system for rotationally constraining the steering wheel, wherein in the disengaged state, the steering wheel is rotationally constrained by the locking mechanism, and wherein the processor is further configured to reset the operational state from the active state to the passive state and reset, based on the passive state, the engagement state from the disengaged state to an engaged state, wherein in the engaged state, the steering wheel is engaged to the steering shaft through the coupling device and rotationally unconstrained by the locking mechanism.

8. The steering system of claim 1, wherein when in the active state, the automated driving system is configured to perform a driving function, and when in the passive state, the automated driving system is configured to not perform the driving function, and when the automated driving system is off the automated driving system is not in the active state or the passive state.

9. The steering system of claim 1, wherein the coupling device includes an electromagnet for selectively engaging the steering wheel to the steering shaft and coupled to the automated driving system.

10. A steering system for a vehicle, the steering system comprising:

a steering assembly for the vehicle, the steering assembly including:

a steering wheel; and a steering mechanism selectively engaged to the steering wheel, wherein in an engaged state, the steering mechanism is engaged to the steering wheel, and in a disengaged state, the steering mechanism is disengaged from the steering wheel and the steering mechanism is configured to rotate independent of the steering wheel; and an automated driving system coupled to the steering assembly and including:

a storage device with instructions; and a processor coupled to the storage device, wherein, when the instructions are executed by the processor, the instructions configure the processor to:

turn the automated driving system to on from off, when the automated diving system is on, set a first operational state of the automated driving system without contact of the steering wheel by an occupant, the first operational state is an active state for performing a driving function for the vehicle;

set, based on the first operational state, a first engagement state of the steering wheel to the steering mechanism; and change from the first operational state of the automated driving system to a second operational state without contact of the steering wheel by the occupant, the second operational state is a passive state, wherein in the passive state, the automated driving system is configured to be dormant, and in both the first operational state and the second operational state, the automated driving system is on; and turn the automated driving system to off from on, when the automated driving system is off, the steering mechanism is in the engaged state and the automated driving system is not in the active state or the passive state.

11. The steering system of claim 10, the steering assembly further comprising a coupling device positioned between the steering wheel and the steering mechanism and configured to selectively engage the steering mechanism to the steering wheel and selectively constrain rotation of the steering wheel, wherein in the disengaged state, the steering wheel is rotationally constrained by the coupling device, and in the engaged state, the steering wheel is rotationally unconstrained by the coupling device.

12. The steering system of claim 11, wherein the automated driving system is coupled to the steering assembly through the coupling device, and the instructions, when executed by the processor, further configure the processor to control the coupling device based on the first engagement state.

13. The steering system of claim 10, wherein the instructions, when executed by the processor, configure the processor to set, based on the first operational state, the first engagement state to the disengaged state, and further configure the processor to change from the first engagement state to a second engagement state based on the change from the first operational state to the second operational state, wherein the second engagement state is the engaged state.

14. The steering system of claim 10, wherein the steering mechanism is attached to a first wheel and a second wheel laterally spaced from the first wheel in relation to a centerline of the vehicle, the steering mechanism is configured to control an angular orientation of the first wheel relative to the centerline and control an angular orientation of the second wheel relative to the centerline, the steering mechanism is configured to control the angular orientation of the first wheel independent of the angular orientation of the second wheel.

15. The steering system of claim 14, wherein the instructions, when executed by the processor, configure the processor to transition from the first engagement state to a second engagement state, for the transition, configure the processor to cause the steering mechanism to individually rotate each of the first wheel and the second wheel to a home position based on position information of the steering wheel.

16. A non-transitory computer-readable storage medium of and on a vehicle and including instructions that, when executed by a processor of and on the vehicle, cause the processor to set an engagement state of a steering wheel in a steering system of and on the vehicle, by performing the steps of:

turning, by the processor an automated driving system of and on the vehicle to on from off the automated driving system is in the steering system;

setting, by the processor, a first operational state of the automated driving system in the steering system, the first operational state is a passive state and in the passive state, the automated driving system is on;

setting, by the processor, a first engagement state of the steering wheel based on the first operational state of the automated driving system, not contact of the steering wheel by an occupant;

engaging, by the processor, the steering wheel to a steering mechanism based on the first engagement state;

changing, by the processor from the first operational state to a second operational state of the automated driving system, the second operational state is an active state and in the active state, the automated driving system is on;

performing a driving function for the vehicle, by the automated driving system, in the active state;

changing by the processor the automated driving system to off from on; and engaging, by the processor, the steering wheel to the steering mechanism while the automated driving system is off.

17. The non-transitory computer-readable storage medium of claim 16, further comprising the step of monitoring, by the automated driving system, in the passive state, an additional system on the vehicle and coupled to the automated driving system, wherein, in the passive state, the automated driving system does not perform the driving function for the vehicle.

18. The non-transitory computer-readable storage medium of claim 16, further comprising the steps of changing, by the processor, the first engagement state to a second engagement state while in the first operational state; and disengaging, by the processor, the steering wheel from the steering mechanism based on the second engagement state, wherein the first engagement state is an engaged state and in the engaged state the steering wheel is engaged to the steering mechanism, and the second engagement state is a disengaged state and in the disengaged state the steering wheel is disengaged from the steering mechanism and the steering mechanism is configured to rotate independent of the steering wheel.

19. The non-transitory computer-readable storage medium of claim 16, further comprising the steps of changing, by the processor, the first engagement state to a second engagement state based on the change from the first operational state to the second operational state, not contact of the steering w bel by the occupant; disengaging, by the processor, the steering wheel from the steering mechanism based on the second engagement state; and locking, by the processor, a locking mechanism coupled to the steering wheel based on the second engagement state, in the second engagement state, the steering wheel is disengaged from the steering mechanism and, due to the locking mechanism, rotationally constrained in a locked position, and the steering mechanism is configured to rotate independent of the steering wheel.

20. The non-transitory computer-readable storage medium of claim 19, further comprising the steps of maintaining, by the processor, the second engagement state independent of contact of the steering wheel by the occupant.

* * * * *